United States Patent
Wagner et al.

(10) Patent No.: US 11,782,139 B2
(45) Date of Patent: Oct. 10, 2023

(54) SELF-CALIBRATION ADAPTIVE LIDAR APERTURE BUILDING-BLOCK LIGHT ENGINE

(71) Applicants: Kelvin Wagner, Boulder, CO (US); Daniel Feldkhun, Boulder, CO (US); Milos Popovic, Boston, MA (US)

(72) Inventors: Kelvin Wagner, Boulder, CO (US); Daniel Feldkhun, Boulder, CO (US); Milos Popovic, Boston, MA (US)

(73) Assignee: The Regents of the University of Colorado, a Body Corporate, Boulder, CO (US)

( * ) Notice: Subject to any disclaimer, the term of this patent is extended or adjusted under 35 U.S.C. 154(b) by 1118 days.

(21) Appl. No.: 16/368,080

(22) Filed: Mar. 28, 2019

(65) Prior Publication Data
US 2020/0225332 A1 Jul. 16, 2020

Related U.S. Application Data

(60) Provisional application No. 62/649,388, filed on Mar. 28, 2018.

(51) Int. Cl.
*G01S 7/4863* (2020.01)
*G01S 7/484* (2006.01)
(Continued)

(52) U.S. Cl.
CPC ........... *G01S 7/4863* (2013.01); *G01S 7/484* (2013.01); *G01S 13/003* (2013.01);
(Continued)

(58) Field of Classification Search
CPC ...... G01S 7/4863; G01S 7/484; G01S 13/003; G01S 13/865; G01S 17/003; G01S 17/89
See application file for complete search history.

(56) References Cited

U.S. PATENT DOCUMENTS 3,419,870 A 12/1968 Wong
5,926,589 A * 7/1999 Gaeta .................. G02B 6/2861
385/16
(Continued)

OTHER PUBLICATIONS

Poulton et al., "Large-scale silicon nitride nanophotonic phased arrays at infrared and visible wavelengths." Optics Letters 42.1 (2017): 21-24.
(Continued)

*Primary Examiner* — Georgia Y Epps
*Assistant Examiner* — Don J Williams
(74) *Attorney, Agent, or Firm* — Smith Baluch LLP

(57) ABSTRACT

A serpentine delay-line waveguide feeding an array of grating couplers can be fabricated in a silicon photonic chip, or tile, with the grating couplers emitting light at an angle that varies with wavelength and delay between the couplers imparted by the waveguide. The beam-steering tile can be used to transmit or receive light from a scene. The tile can be arrayed with one or more other tiles for bistatic radar-lidar operation. A tile in the array may transmit probe and frequency-shifted reference beams, while another tile may receive a return at a heterodyne frequency giving a range to the scene. The pitch of the serpentine delay line may be different for transmitting and receiving tiles to suppress returns from unwanted directions. Pairs of phase-cohered tiles may illuminate a spot in the scene with fringe patterns, producing oscillating returns that can be processed to form a high-resolution sub-image by Fourier synthesis.

19 Claims, 21 Drawing Sheets

(51) Int. Cl.
G01S 13/00 (2006.01)
G01S 17/00 (2020.01)
G01S 13/86 (2006.01)
G01S 17/89 (2020.01)
(52) U.S. Cl.
CPC .......... *G01S 13/865* (2013.01); *G01S 17/003* (2013.01); *G01S 17/89* (2013.01)

(56) References Cited

U.S. PATENT DOCUMENTS

| | | | |
|---|---|---|---|
| 6,016,196 A | 1/2000 | Mermelstein | |
| 6,548,820 B1 | 4/2003 | Mermelstein | |
| 7,657,132 B1* | 2/2010 | Yap | G02F 1/035 385/12 |
| 9,081,252 B2 | 7/2015 | Aflatouni et al. | |
| 2008/0267565 A1* | 10/2008 | Chen | G02F 1/3136 385/45 |
| 2019/0129008 A1* | 5/2019 | Lin | G01S 17/42 |

OTHER PUBLICATIONS

Poulton et al., "Long-Range LiDAR and Free-Space Data Communication With High-Performance Optical Phased Arrays." IEEE Journal of Selected Topics in Quantum Electronics 25.5 (2019): 1-8.
Rabb et al., "Special Section Guest Editorial: Computational Approaches to Imaging LADAR." Optical Engineering 54.3 (2015): 031101. 2 pages.
Rabinovich et al., "Two-dimensional beam steering using a thermo-optic silicon photonic optical phased array." Optical Engineering 55.11 (2016): 111603. 8 pages.
Raval et al., "Unidirectional waveguide grating antennas with uniform emission for optical phased arrays." Optics Letters 42.13 (2017): 2563-2566.
Schwab, "Adaptive calibration of radio interferometer data." 1980 Intl Optical Computing Conf I. vol. 231. International Society for Optics and Photonics, 1980. 9 pages.
Shang et al., "Uniform emission, constant wavevector silicon grating surface emitter for beam steering with ultra-sharp instantaneous field-of-view." Optics Express 25.17 (2017): 19655-19661.
Sica, "Effects of nonredundance on a synthetic-aperture imaging system." Josa A 10.4 (1993): 567-572.
Slivken et al., "Monolithic beam steering in a mid-infrared, surface-emitting, photonic integrated circuit." Scientific Reports 7.1 (2017): 8472. 7 pages.
Sun et al., "Large-scale nanophotonic phased array." Nature 493. 7431 (2013): 195. 5 pages.
Sun et al., "Large-scale silicon photonic circuits for optical phased arrays." IEEE Journal of Selected Topics in Quantum Electronics 20.4 (2014): 264-278.
Sun et al., "Si Photonics for Practical LIDAR Solutions." Applied Sciences 9.20 (2019): 4225. 25 pages.
Sun et al., "Single-chip microprocessor that communicates directly using light." Nature 528.7583 (2015): 534. 11 pages.
Sun et al., "Two-dimensional apodized silicon photonic phased arrays." Optics Letters 39.2 (2014): 367-370.
Sun, Toward accurate and large-scale silicon photonics. Dissertation. Massachusetts Institute of Technology, 2013. 163 pages.
Tyler et al., "SiN integrated optical phased arrays for two-dimensional beam steering at a single near-infrared wavelength." Optics Express 27.4 (2019): 5851-5858.
Ustinov et al., "Active aperture synthesis in observation of objects via distorting media." Soviet Journal of Quantum Electronics 17.1 (1987): 108. 4 pages.
Van Acoleyen et al., "Efficient light collection and direction-of-arrival estimation using a photonic integrated circuit." IEEE Photonics Technology Letters 24.11 (2012): 933-935.
Van Acoleyen et al., "Off-chip beam steering with a one-dimensional optical phased array on silicon-on-insulator." Optics Letters 34.9 (2009): 1477-1479.
Van Acoleyen et al., "One-dimensional off-chip beam steering and shaping using optical phased arrays on silicon-on-insulator." Journal of Lightwave Technology 29.23 (2011): 3500-3505.
Van Acoleyen et al., "Two-dimensional dispersive off-chip beam scanner fabricated on silicon-on-insulator." IEEE Photonics Technology Letters 23.17 (2011): 1270-1272.
Van Acoleyen et al., "Two-dimensional optical phased array antenna on silicon-on-insulator." Optics Express 18.13 (2010): 13655-13660.
Vercesi et al., "Frequency-agile dual-frequency lidar for integrated coherent radar-lidar architectures." Optics Letters 40.7 (2015): 1358-1361.
Wade et al., "75% efficient wide bandwidth grating couplers in a 45 nm microelectronics CMOS process." 2015 IEEE Optical Interconnects Conference (OI). IEEE, 2015, pp. 46-47.
Wang et al., "Continuous angle steering of an optically-controlled phased array antenna based on differential true time delay constituted by micro-optical components." Optics Express 23.7 (2015): 9432-9439.
Xiao et al., "Optical phased-array beam steering controlled by wavelength." Applied Optics 44.26 (2005): 5429-5433.
Xie et al., "Heterogeneous silicon photonics sensing for autonomous cars." Optics Express 27.3 (2019): 3642-3663.
Xu et al., "Aliasing-free optical phased array beam-steering with a plateau envelope." Optics Express 27.3 (2019): 3354-3368.
Yaacobi et al., "Integrated phased array for wide-angle beam steering." Optics Letters 39.15 (2014): 4575-4578.
Yaacobi, Integrated optical phased arrays for lidar applications. Dissertation. Massachusetts Institute of Technology, 2015. 120 pages.
Yang et al., "Two-dimensional wavelength demultiplexing employing multilevel arrayed waveguides." Optics Express 12.6 (2004): 1084-1089.
Yoo et al., "A 32×32 optical phased array using polysilicon sub-wavelength high-contrast-grating mirrors." Optics Express 22.16 (2014): 19029-19039.
Yoo et al., "Optical phased array using high contrast gratings for two dimensional beamforming and beamsteering." Optics Express 21.10 (2013): 12238-12248.
Zadka et al., "On-chip platform for a phased array with minimal beam divergence and wide field-of-view." Optics Express 26.3 (2018): 2528-2534.
Zhang et al., "Multi-beam steering with low grating lobes using optimized unequally spaced phased array." Optics Communications 427 (2018): 48-53.
Zhang et al., "Sub-wavelength-pitch silicon-photonic optical phased array for large field-of-regard coherent optical beam steering." Optics Express 27.3 (2019): 1929-1940.
Zheng et al., "Waveguide-based optical phased array." IEEE Photonics Technology Letters 25.18 (2013): 1826-1828.
Zhuang et al., "Omnidirectional beam steering using aperiodic optical phased array with high error margin." Optics Express 26.15 (2018): 19154-19170.
Abe et al., "Two-dimensional beam-steering device using a doubly periodic Si photonic-crystal waveguide." Optics Express 26.8 (2018): 9389-9397.
Abediasl et al., "Monolithic optical phased-array transceiver in a standard SOI CMOS process." Optics Express 23.5 (2015): 6509-6519.
Abiri et al., "Electronic two-dimensional beam steering for integrated optical phased arrays." Optical Fiber Communication Conference. Optical Society of America, 2014. 3 pages.
Aflatouni et al., "Nanophotonic coherent imager." Optics Express 23.4 (2015): 5117-5125.
Arnot et al. "Phase closure in optical astronomy." (1985). 8 pages.
Brunke et al., "Broad-bandwidth radiation patterns of sparse two-dimensional vernier arrays." IEEE Transactions on Ultrasonics, Ferroelectrics, and Frequency Control 44.5 (1997): 1101-1109.
Campbell et al., "Synthetic-aperture imaging through an aberrating medium: experimental demonstration." Applied Optics 34.26 (1995): 5932-5937.

(56) References Cited

OTHER PUBLICATIONS

Chan et al., "2-Dimensional beamsteering using dispersive deflectors and wavelength tuning." Optics Express 16.19 (2008): 14617-14628.
Chan et al., "Optical beamsteering using an 8×8 MEMS phased array with closed-loop interferometric phase control." Optics Express 21.3 (2013): 2807-2815.
Cheng et al., "Real-time two-dimensional beam steering with gate-tunable materials: a theoretical investigation." Applied Optics 55.22 (2016): 6137-6144.
Chung et al., "A monolithically integrated large-scale optical phased array in silicon-on-insulator CMOS." IEEE Journal of Solid-State Circuits 53.1 (2018): 275-296.
Cornwell et al., "A new method for making maps with unstable radio interferometers." Monthly Notices of the Royal Astronomical Society 196.4 (1981): 1067-1086.
Diaz et al., "Lidar detection using a dual-frequency source." Optics Letters 31.24 (2006): 3600-3602.
Dostart et al., "Vernier Si-photonic phased array for grating lobe suppression and extended FOV," in CLEO, May 2019, 2 pages.
Doylend et al. "Two-dimensional free-space beam steering with an optical phased array on silicon-on-insulator." Optics Express 19.22 (2011): 21595-21604.
Doylend et al., "Hybrid III/V silicon photonic source with integrated 1D free-space beam steering." Optics Letters 37.20 (2012): 4257-4259.
Feldkhun et al., "Doppler encoded excitation pattern tomographic optical microscopy." Applied Optics 49.34 (2010): H47-H63. 17 pages.
Feldkhun et al., "Frequency-mapped focus-free F-BASIS 3D microscopy." Computational Optical Sensing and Imaging. Optical Society of America, 2015. 3 pages.
Feldkhun, Doppler Encoded Excitation Pattern (DEEP) Microscopy. PhD thesis, University of Colorado at Boulder, 2010. 406 pages.
Furukado et al., "Experimental simulation of ranging action using Si photonic crystal modulator and optical antenna." Optics Express 26.14 (2018): 18222-18229.
Furxhi et al., "Echelle crossed grating millimeter wave beam scanner." Optics Express 22.13 (2014): 16393-16407.
Gabrielli et al., "Aperiodic antenna array for secondary lobe suppression." IEEE Photonics Technology Letters 28.2 (2016): 209-212.
Ghosh et al., "Computational LADAR imaging." Applied Optics 56.3 (2017): B191-B197. 7 pages.
Golay, "Point arrays having compact, nonredundant autocorrelations." JOSA 61.2 (1971): 272-273.
Guo et al., "Two-dimensional optical beam steering with InP-based photonic integrated circuits." IEEE Journal of Selected Topics in Quantum Electronics 19.4 (2013): 6100212-6100212. 12 pages.
Haniff, "Phase closure imaging-theory & practice," Diffraction-Limited Imaging with Very Large Telescopes. Springer, Dordrecht, 1989. 171-190. 23 pages.
Heck, "Highly integrated optical phased arrays: photonic integrated circuits for optical beam shaping and beam steering." Nanophotonics 6.1 (2017): 93. 15 pages.
Holmes et al., "Analysis and simulation of a synthetic-aperture technique for imaging through a turbulent medium." Josa A 13.2 (1996): 351-364.

Hong et al., "Lensless focusing with subwavelength resolution by direct synthesis of the angular spectrum." Applied Physics Letters 88.26 (2006): 261107. 3 pages.
Huang et al., "High speed, high power one-dimensional beam steering from a 6-element optical phased array." Optics Express 20.16 (2012): 17311-17318.
Hulme et al., "Fully integrated hybrid silicon two dimensional beam scanner." Optics Express 23.5 (2015): 5861-5874.
Hutchison et al., "High-resolution aliasing-free optical beam steering." Optica 3.8 (2016): 887-890.
Ito et al., "Wavelength-division multiplexing Si photonic crystal beam steering device for high-throughput parallel sensing." Optics Express 26.20 (2018): 26145-26155.
Kim et al., "A Single-Chip Optical Phased Array in a Wafer-Scale Silicon Photonics/CMOS 3D-Integration Platform." IEEE Journal of Solid-State Circuits 54.11 (2019): 3061-3074.
Kim et al., "Photonic waveguide to free-space Gaussian beam extreme mode converter." Light: Science & Applications 7.1 (2018): 72. 13 pages.
Komljenovic et al., "On-chip calibration and control of optical phased arrays." Optics Express 26.3 (2018): 3199-3210.
Komljenovic et al., "Sparse aperiodic arrays for optical beam forming and LIDAR." Optics Express 25.3 (2017): 2511-2528.
Kondo et al., "Fan-beam steering device using a photonic crystal slow-light waveguide with surface diffraction grating." Optics Letters 42.23 (2017): 4990-4993.
Kossey et al., "End-fire silicon optical phased array with half-wavelength spacing." APL Photonics 3.1 (2018): 011301.
Kwong et al., "1×12 Unequally spaced waveguide array for actively tuned optical phased array on a silicon nanomembrane." Applied Physics Letters 99.5 (2011): 051104. 4 pages.
Kwong et al., "On-chip silicon optical phased array for two-dimensional beam steering." Optics Letters 39.4 (2014): 941-944.
McManamon et al., "A review of phased array steering for narrow-band electrooptical systems." Proceedings of the IEEE 97.6 (2009): 1078-1096.
McManamon et al., "Optical phased array technology." Proceedings of the IEEE 84.2 (1996): 268-298.
Morvan et al., "Building blocks for a two-frequency laser lidar-radar: a preliminary study." Applied Optics 41.27 (2002): 5702-5712.
Nakamura et al., "Slow-light Bragg reflector waveguide array for two-dimensional beam steering." Japanese Journal of Applied Physics 53.3 (2014): 038001. 4 pages.
Nikkhah et al., "Beam steering for wireless optical links based on an optical phased array in silicon." Annals of Telecommunications-Annales des Télécommunications 68.1-2 (2013): 57-62.
Notaros et al.,"Ultra-efficient CMOS fiber-to-chip grating couplers." 2016 Optical Fiber Communications Conference and Exhibition (OFC). IEEE, 2016. 3 pages.
Oh et al., "Free-space transmission with passive 2D beam steering for multi-gigabit-per-second per-beam indoor optical wireless networks." Optics Express 24.17 (2016): 19211-19227.
Pinna et al., "Vernier Transceiver Architecture for Side-Lobe-Free and High-Entendue LiDAR." 2018 Conference on Lasers and Electro-Optics (CLEO), IEEE, 2018. 2 pages.
Poulton et al., "Coherent solid-state LIDAR with silicon photonic optical phased arrays." Optics Letters 42.20 (2017): 4091-4094.

* cited by examiner

CW modulation tone for each steered beam

Double chirp Radar-LIDAR for different modulation to each Beam

Stepped+Swept Frequency for Chirped Intensity to Each Beam

SELF-CALIBRATION ADAPTIVE LIDAR APERTURE BUILDING-BLOCK LIGHT ENGINE

CROSS-REFERENCE TO RELATED APPLICATION(S)

This application claims the priority benefit, under 35 U.S.C. § 119(e), of U.S. Application No. 62/649,388, filed on Mar. 28, 2019, which is incorporated herein by reference in its entirety.

BACKGROUND

LIDARs come in two varieties: incoherent and coherent. In incoherent ranging LIDARs a simple short (e.g., nanosecond) pulse is transmitted by a telescope and the collected returns are directly detected on a large area detector at the focal plane that integrates across all the collected speckle (due to unavoidable roughness of the scattering object). In coherent LIDARs, the return is combined on a beam splitter with a local-oscillator plane-wave reference laser beam and heterodyne detected to provide noiseless front-end gain and to enable the utilization of sophisticated coherent waveforms that allows Doppler and micro-Doppler vibration analysis.

But the difficulty of matching the wave front of a speckled return with a plane-wave reference greatly reduces the potential benefit of coherent detection, especially for large receiving apertures. The sensitivity to target motion on an optical wavelength scale is an amazing capability of coherent LIDARs, but often unneeded for many classes of targets.

Radar-LIDAR is an alternative technique that achieves the range and Doppler resolution of equivalent bandwidth radars using the collimation and resolution capabilities of optical LIDAR without the complexities of heterodyne detection with an unknown speckle field. In Radar-LIDAR, the heterodyne reference beam is transmitted along with the signal beam toward the target. Both beams bounce back with essentially identical speckle and are perfectly overlapped for ideal coherent heterodyne detection of the entire blinking speckle field on a large-area detector. Since the reference beam also experiences $1/R^2$ loss on return, radar-LIDAR is not as efficient as conventional coherent LIDAR, but in practice the signals produced are superior.

SUMMARY

We present silicon-photonic LIDAR transmitting and receiving tiles in which each tile performs folded, two-dimensional, wavelength-encoded beam steering. Each beam-steering tile has a serpentine delay line with vertical-to-surface grating output couplers enabling folded coarse/fine wavelength beam steering. Each tile is a Self-Calibrated Adaptive LIDAR Aperture Building-block Light Engine (SCALABLE) due to its thin planar form factor, high fill factor, millimeter-square area, and use of standard CMOS fabrication or semiconductor fabrication techniques similar to CMOS fabrication. Many tiles can be arranged in an array whose architecture is scalable to a large one- or two-dimensional aperture whose outputs can be coherently combined in post-detection signal processing. Arrays of these silicon photonic tiles can be assembled into a wafer-scale Si-photonic emitting aperture which is hybrid-coupled to a III-V substrate containing photonic distribution and amplification circuitry as well as the frequency tunable laser sources. The resulting beam-steering system can scan multiple GHz-modulated LIDAR beams into arbitrary directions simultaneously using laser wavelength tuning of one or more laser sources.

If desired, the beam-steering system can be used in a Radar-LIDAR scheme in which a frequency-shifted reference beam is transmitted along with the signal beam. The signal and reference beams reflect and/or scatter off objects in the scene to create identical or nearly identical speckle patterns that interfere temporally at the heterodyne frequency. This causes the return speckle pattern collected by one or more receive tiles (or auxiliary large collecting aperture) to blink, thereby avoiding the heterodyne efficiency loss due to speckle that plagues conventional coherent LIDARs.

The received signals can be coherently collected in the waveguides of receiving tiles with a Verniered serpentine grating row spacing to mitigate grating lobes, detected in each tile, and then current summed across the array of tiles to achieve the full coherent array gain of a large receive aperture. By transmitting appropriate single-side-band frequency-offset signals fed by the same laser from a non-redundant spatial sub-array of N tiles, $O(N^2)$ moving fringe patterns are produced via pairwise interference of the beam-steered lobes illuminating the target in the far field. The back-scattered returns oscillate at the corresponding difference frequencies and represent the spatial Fourier components of the corresponding interferometric fringe pattern traveling across the illuminated area, enabling high-resolution imaging of this area illuminated by the 2D beam-steered spot via Fourier synthesis. The entire array can be globally cohered using phase closure by applying self-calibration to these LIDAR returns to compensate for manufacturing defects and thermal gradients across the array of tiles.

One example of this beam-steering technology is a beam-steering system with a substrate, a serpentine optical waveguide disposed on the substrate, and an array of coupler regions formed in or on the serpentine optical waveguide. In operation, the serpentine optical waveguide guides optical radiation. The coupler regions emit the optical radiation toward a scene at an angle that varies in a first axis and a second axis with a wavelength of the optical radiation. And a first of these coupler regions delays optical radiation guided to a second coupler region in the array of coupler regions via the serpentine optical waveguide.

The beam-steering system can also include a coherent light source optically coupled to the serpentine optical waveguide. This coherent light source tunes the wavelength of the optical radiation over a bandwidth of about 200 nm in under about 10 ms. It can emit reference optical radiation shifted in frequency with respect to the optical radiation by less than a resolution bandwidth of the array of coupler regions. In this case, the grating coupler regions can emit the reference optical radiation toward the scene at an angle that varies in the first axis and the second axis with a wavelength of the reference optical radiation.

The coupler regions in the array of coupler regions can be parallel to each other along the first axis and define respective gratings with grating vectors parallel to the second axis.

The serpentine optical waveguide can be a transmit serpentine optical waveguide and the array of coupler regions can be an array of transmit coupler regions, in which case the beam-steering apparatus may include a receive serpentine optical waveguide and an array of receive coupler regions formed in or on the receive serpentine optical waveguide. These receive coupler regions couple at least one return from the scene into the receive serpentine optical waveguide. In this case, the array of transmit coupler regions are spaced at a first pitch and the array of receive coupler regions are spaced at a second pitch different than the first pitch. The transmit coupler regions may have a first grating periodicity and the array of receive coupler regions may have a second grating periodicity different than the first grating periodicity.

The transmit serpentine optical waveguide and array of transmit coupler regions can form a transmit beam-steering tile in a two-dimensional array of transmit beam-steering tiles. Likewise, the receive serpentine optical waveguide and array of receive coupler regions can form a receive beam-steering tile in a two-dimensional array of receive beam-steering tiles. This transmit beam-steering tile may also include a phase modulator, operably coupled to the transmit serpentine waveguide, to modulate at least one of a phase or a frequency of the optical radiation.

Another example of the beam-steering technology disclosed here is a lidar with at least one coherent light source (e.g., a tunable laser), a transmit array optically coupled to the coherent light source, and a receive array. The transmit and receive arrays have, respectively, receiving and transmitting grating lobes spaced at different periods. In operation, the coherent light source emits a probe beam. The transmit array directs the probe beam onto a scene at an angle that varies with a wavelength of the probe beam. And the receive array receives returns from the scene, with the receiving grating lobes suppressing returns at angles corresponding to at least one transmitting grating lobe.

The coherent light source can emit a reference beam shifted in frequency with respect to the probe beam by a frequency shift less than a resolution bandwidth of the transmit array. In this case, the transmit array directs the reference beam onto the scene at an angle that varies with a wavelength of the reference beam. This reference beam interferes with the probe beam to produce an intensity beat. A photodetector in optical communication with the receive array detects a heterodyne signal at a frequency of the intensity beat on the scene. The frequency of the heterodyne signal depends on the distance to the scene.

The transmit array may include a serpentine optical waveguide to guide the probe beam. This serpentine optical waveguide can have (i) parallel waveguide sections arrayed at a first pitch and connected by respective delay-line waveguide sections and (ii) gratings formed in the parallel waveguide sections to emit respective portions of the wavelength-tunable probe beam toward the scene.

The transmit array can be a first transmit array in a two-dimensional array of transmit arrays and the probe beam can be a first probe beam, in which case the two-dimensional array of transmit arrays includes a second transmit array to direct a second wavelength-tunable probe beam onto the scene at an angle that varies with a wavelength of the second probe beam. A phase modulator operably coupled to the first transmit array temporally modulates a relative phase of the first probe beam with respect to the second probe beam. The first probe beam interferes with the second laser beam to produce a spatial fringe pattern with a spatial phase depending on the relative phase.

In some cases, the phase modulator modulates the first probe beam with a pseudo-noise (PN) waveform so as to illuminate the scene with a temporally PN-modulated spatial fringe pattern. The temporal PN modulation can be used to discriminate the spatial fringe pattern from other spatial fringe patterns. The phase modulator can modulate the first laser beam with a pseudo-random waveform so as to produce PN-modulated returns received by the receive array, where a temporal shift of the PN modulated returns depending on the distance to the scene.

The beam-steering technology disclosed here can be used for remote sensing. An example method of remote sensing includes generating a first illumination beam and a second illumination beam coherent with the first illumination beam. Respective grating regions in a first serpentine delay-line grating coupler in a first transmit array in a two-dimensional array of transmit arrays direct the first illumination beam onto a scene. Respective grating regions in a second serpentine delay-line grating coupler in a second transmit array in the two-dimensional array of transmit arrays direct the second illumination beam onto the scene to produce a fringe pattern. A phase modulator shifts a phase of the fringe pattern by controlling a relative phase between the first illumination beam and the second illumination beam. And a return array receives a return from the scene. This return has an amplitude and a phase corresponding to a spatial Fourier component of the scene substantially matching an amplitude and a phase of the fringe pattern.

If desired, a third transmit array in the two-dimensional array of transmit arrays can direct a third illumination beam onto the scene to produce another fringe pattern, in which case the receive array receives another return from the scene. This other return represents a spatial Fourier component of the scene probed by the other fringe pattern.

The spatial Fourier component represents part of an image of the scene. This image can be three-dimensional. The spatial Fourier component can be used to estimate a phase offset between the first and second transmit arrays based on a model of the image of the scene.

The first, second, and third transmit arrays may be non-redundantly spaced.

Yet another example includes an integrated on-chip optical phased array tile for solid-state beam steering comprising a waveguide input port in plane of the chip, a beam ports aperture, and a plurality of waveguide rows comprising at least a first row waveguide and a second row waveguide. The beam ports aperture supports the transmission of a free space optical beam in one or more of a plurality of directions out of the plane of the chip. Each of the first and the second row waveguides propagates guided light coupled from the waveguide input port. Each of the first and the second row waveguides is coupled to a respective radiator grating structure that couples a first portion of the guided light to a beam in the beam ports aperture with a second portion of the guided light remaining guided in the waveguide. The portion of guided light coupled from the waveguide input port to the second row waveguide is delayed relative to the portion of guided light coupled from the waveguide input port to the first row waveguide by an optical waveguide delay line. And the optical waveguide delay line includes the first row optical waveguide. The waveguides can be substantially parallel.

As the beam steers, each different angle from the beam ports aperture is technically a different spatial mode. Hence, the device can be considered a wavelength "demultiplexer" in that it maps wavelength to spatial mode, and the spatial modes happen to correspond to different angle beams out of the same spatial position—hence the term "beam ports aperture."

Yet another example is a tiled integrated optical phased array system for Vernier beam forming and lidar. This system may include first and second tiles, each of which comprises an on-chip array of unit cells, where each unit cell comprises a radiating optical waveguide structure. The unit cells in the first and second tiles can be spaced by different first and second row-to-row spacings, respectively. The radiating optical waveguide structure of the unit cell of the first tile can have a width that supports multiple guided modes and can be coupled to a single-mode waveguide via a tapered waveguide.

Still another embodiment includes a synthetic aperture tiled integrated optical phased array system. This system includes optical phased array transmit tiles on chip for coupling light from respective transmit tile input ports to a free space optical beam, at least one receiver, a system input port coupled to a light source, and a control system that couples the system input port to the respective transmit tile input ports. This control system may include elements that generate and transmit different electromagnetic modes to different tiles of the plurality of optical phased array transmit tiles, such as optical switch elements or optical modulator elements (e.g., phase modulators).

The different electromagnetic modes can be different temporal or spectral modes. They can also be defined in a code basis where each tile emits light modulated with a different PN code. The control system can couple light to two transmit tiles of the plurality of optical phased array transmit tiles at any one time. It can also couples light comprising a first wave at a carrier frequency and a second wave at a sideband frequency to two or more of the transmit tiles with a different sideband frequency for each tile.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1A:
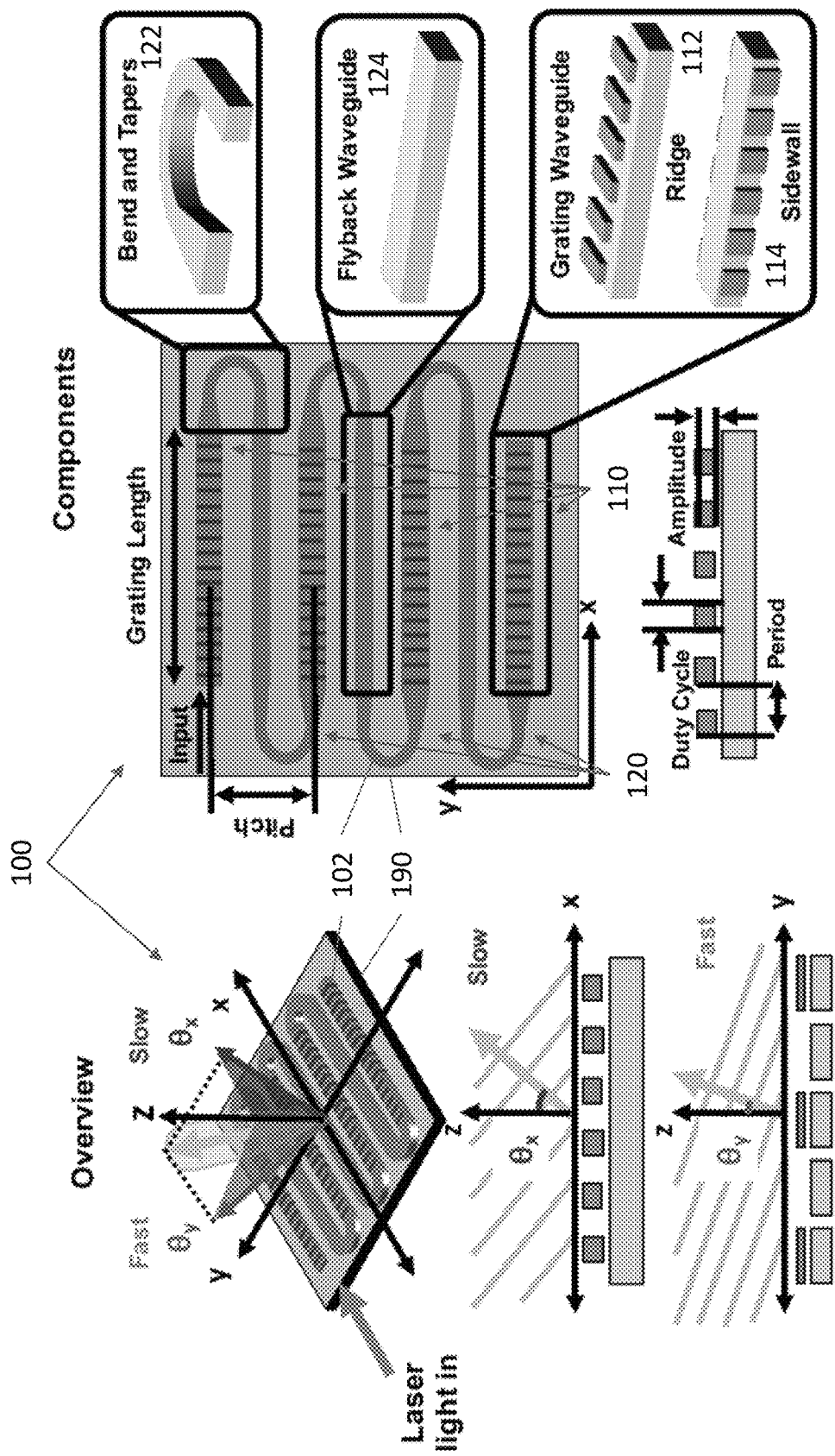
FIG. 1A shows a serpentine delay-line grating coupler made from an optical waveguide with parallel grating coupler sections connected by curved, tapered delay-line sections.
Figure 1B:
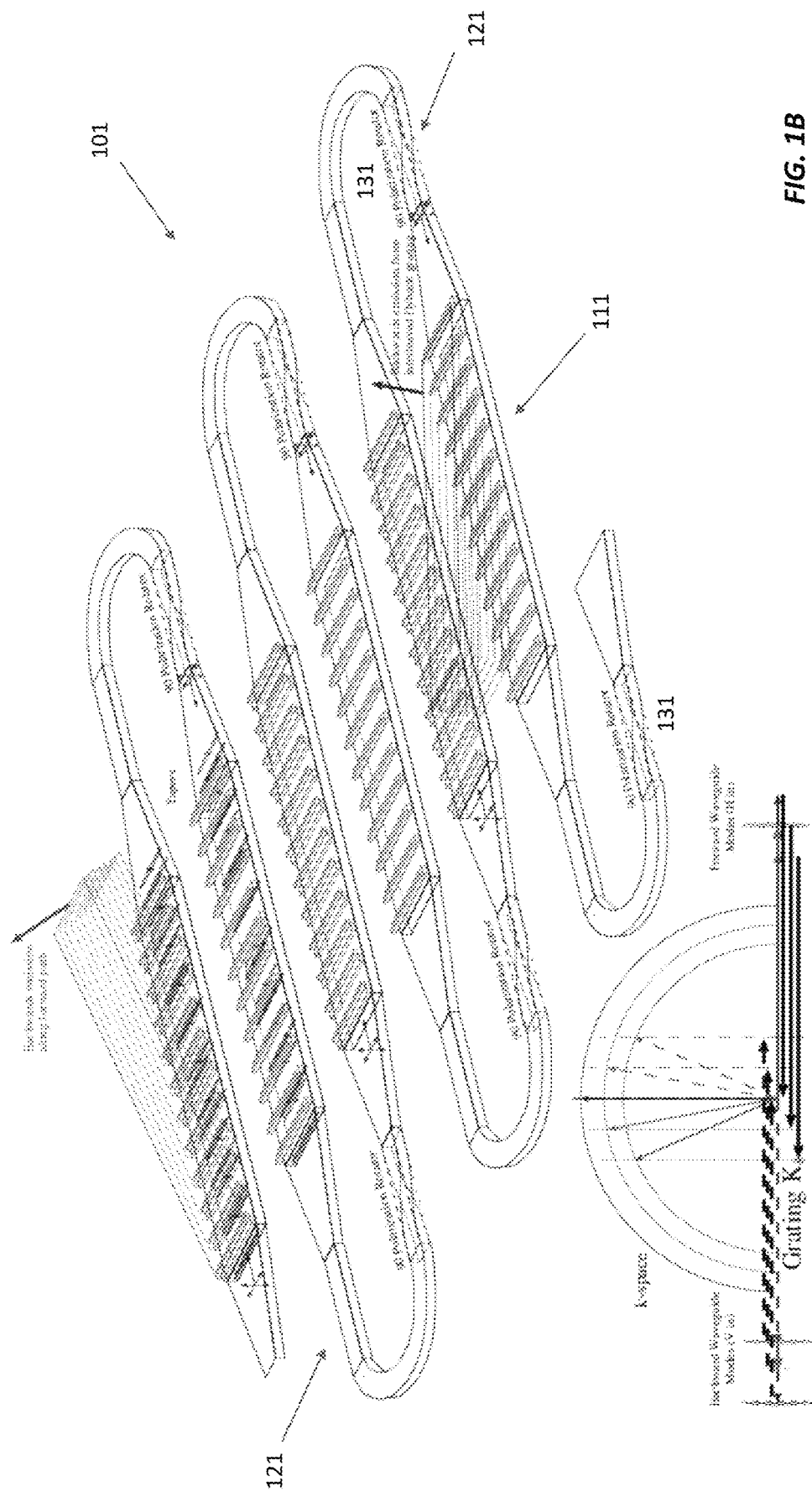
FIG. 1B shows a serpentine delay-line grating coupler with two polarizations multiplexed in a single input waveguide.
Figure 1C:
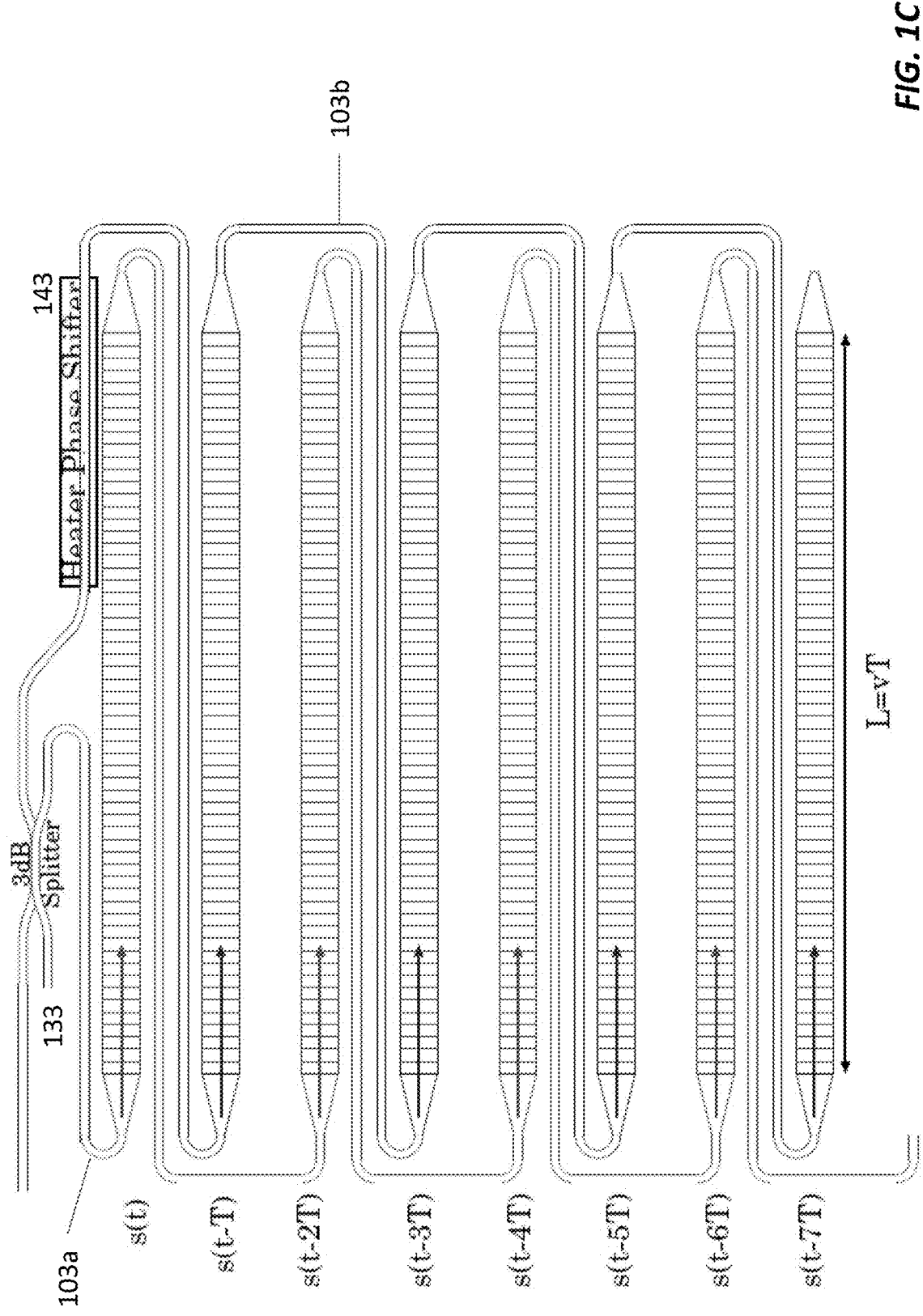
FIG. 1C shows interleaved serpentine delay-line grating couplers without any grating crossings.
Figure 1D:
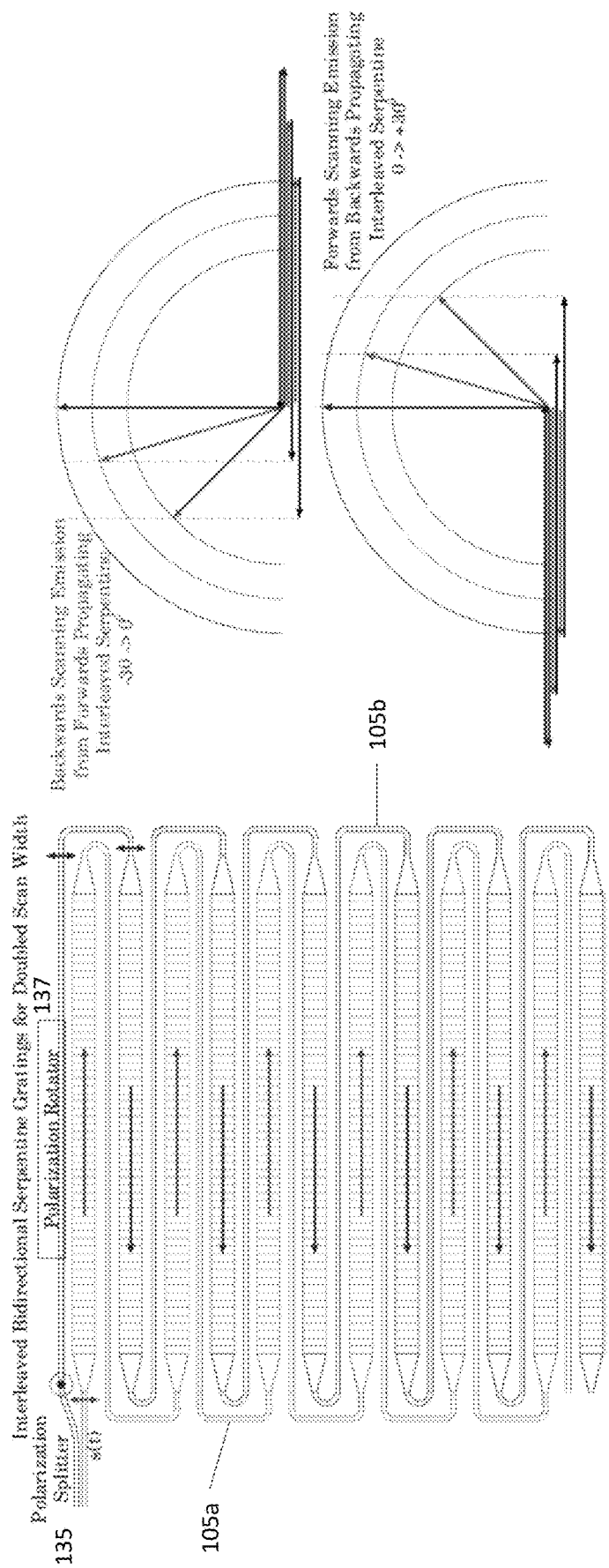

FIG. 1D interleaved serpentine delay-line grating couplers with an increased scan range.

Figure 1E:
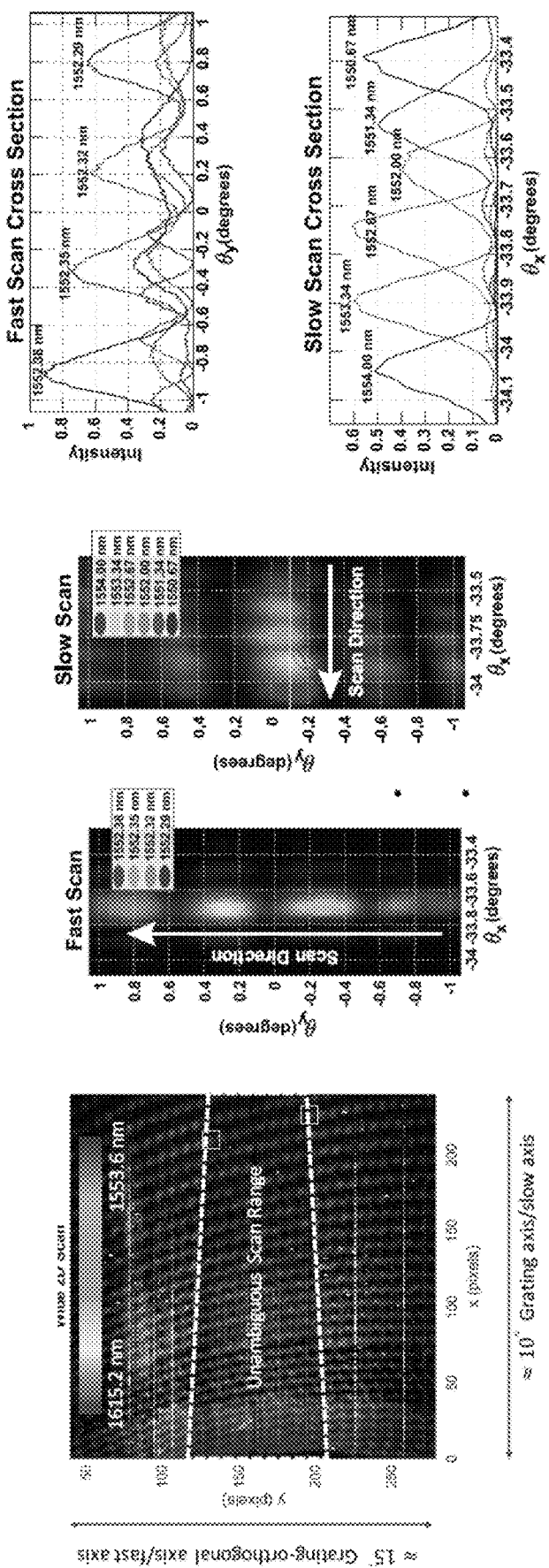

FIG. 1E shows experimental measurements of one- and two-dimensional beam scans made with a serpentine delay-line grating coupler.

Figure 2A:
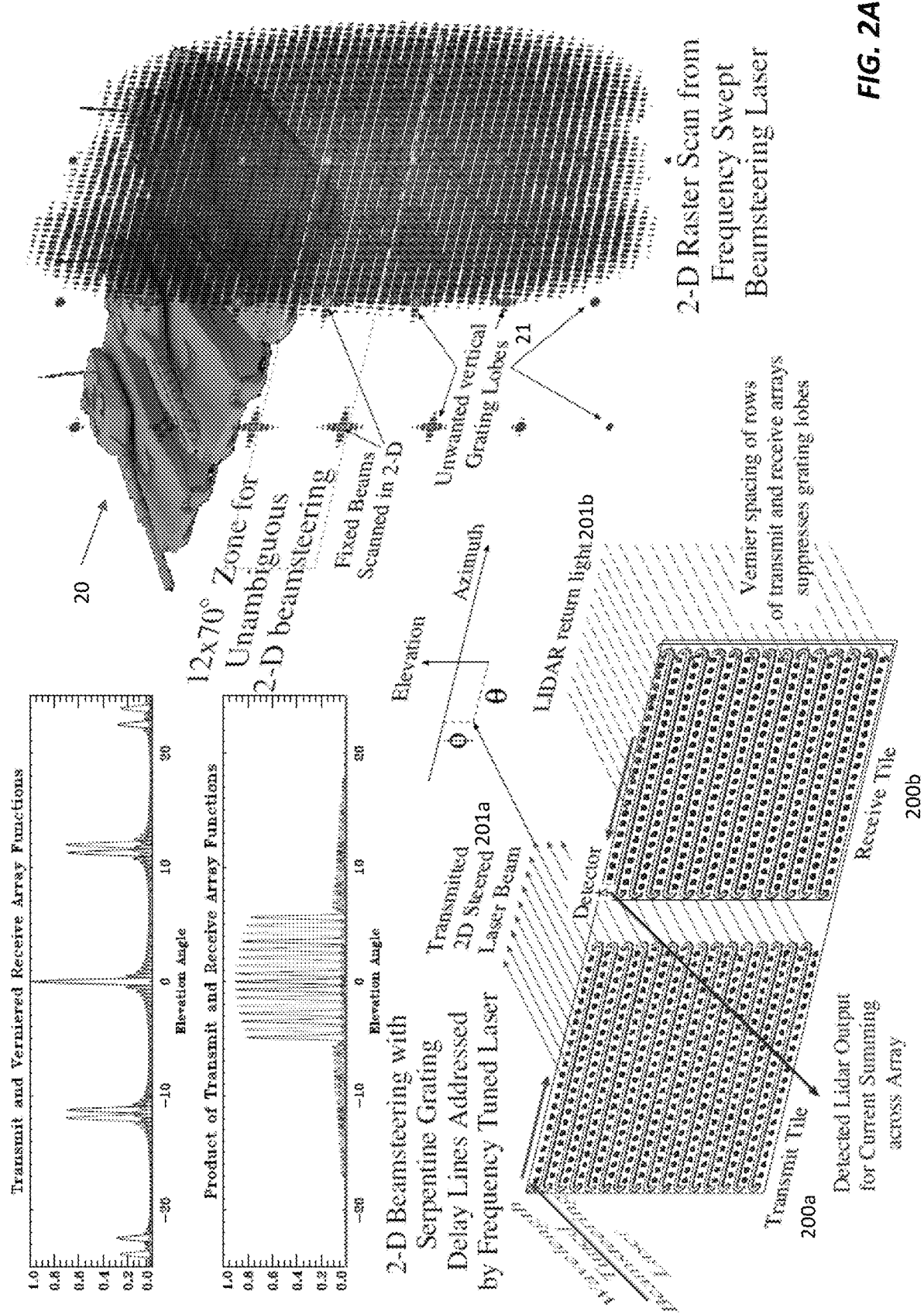

FIG. 2A illustrates lidar measurements using transmit and receive serpentine delay-line grating couplers with different (Vernier) row spacings for grating lobe suppression.

Figure 2B:
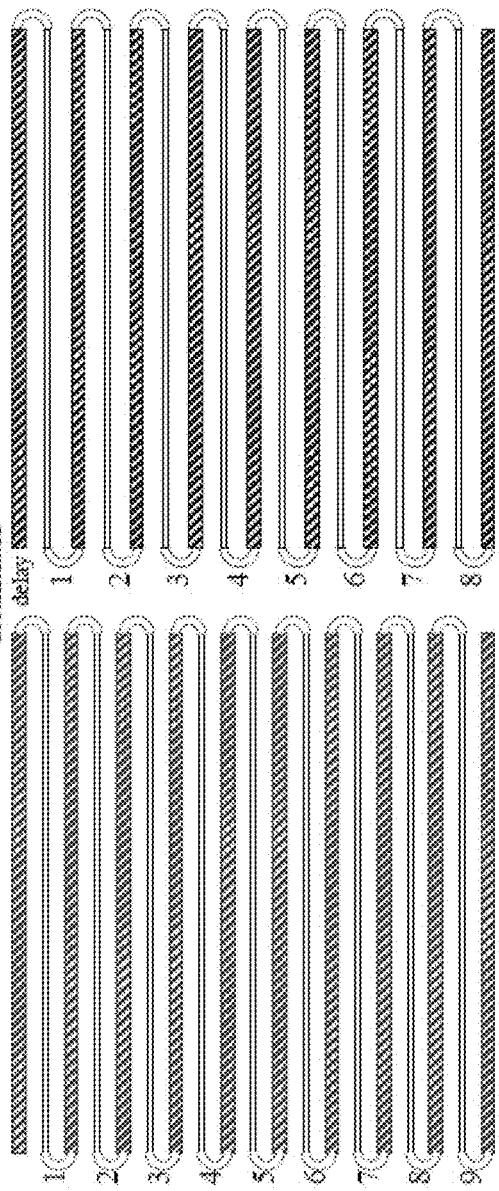

FIG. 2B shows transmit and receive serpentine delay-line grating couplers with identical grating regions at different (Vernier) row spacings with the same phase increments from row to row for grating lobe suppression.

Figure 2C:
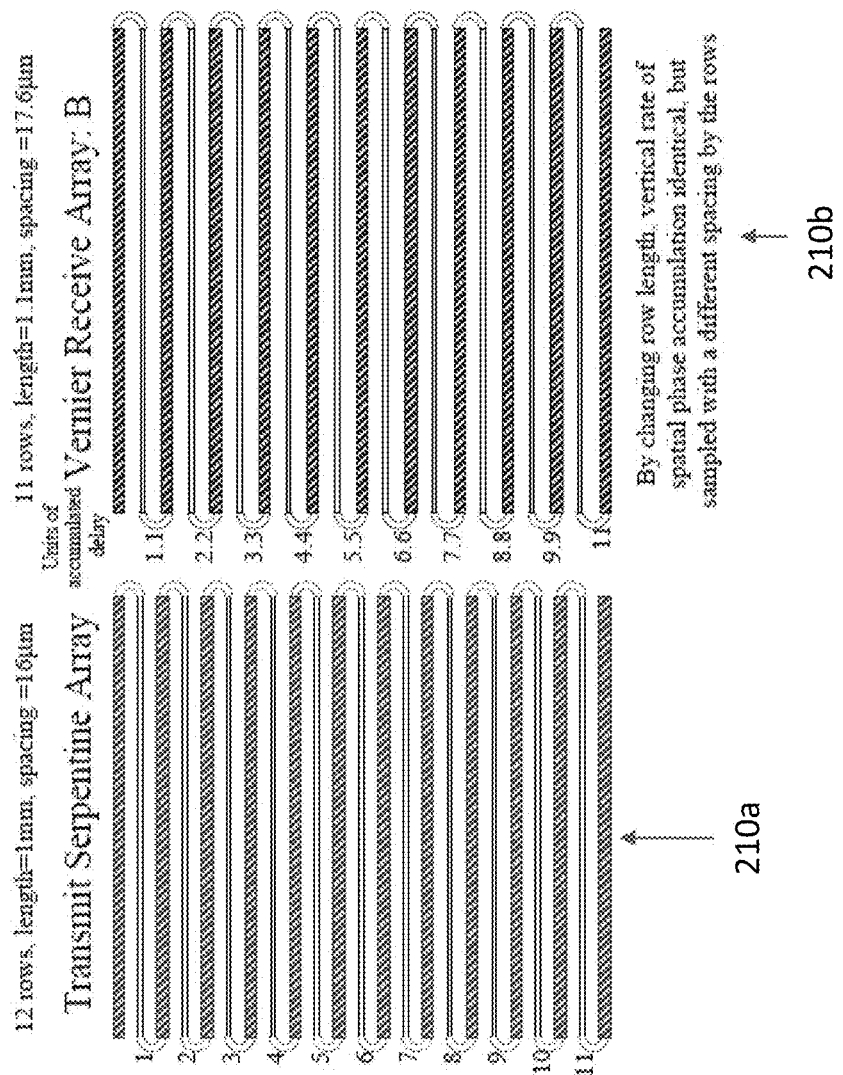

FIG. 2C shows transmit and receive serpentine delay-line grating couplers with grating regions that have different row spacings and different row lengths to accumulate phase at the same rate with space for grating lobe suppression.

Figure 3A:
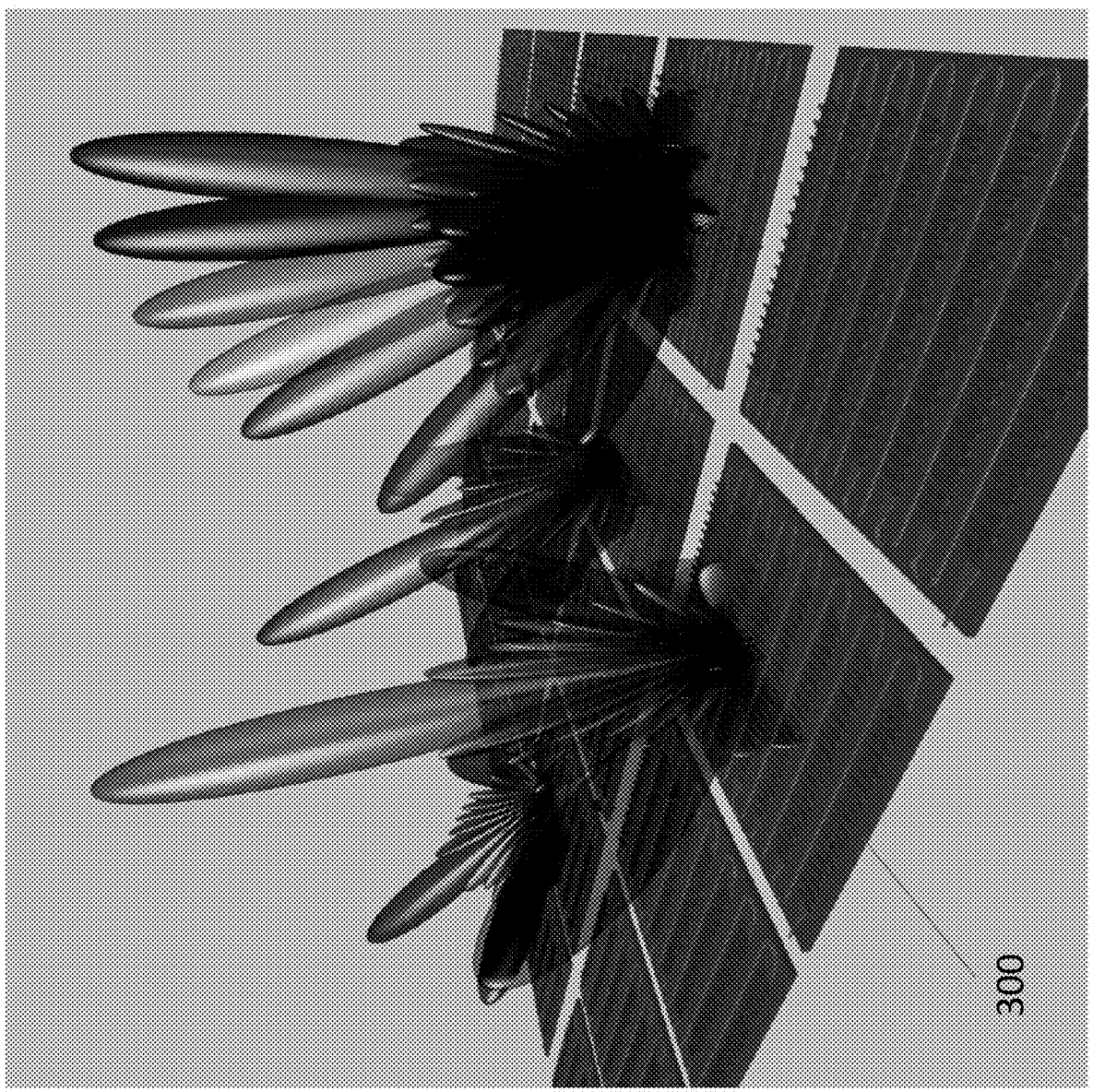

FIG. 3A shows a two-dimensional array of serpentine delay-line grating coupler tiles for beam steering and receiving returns.

Figure 3B:
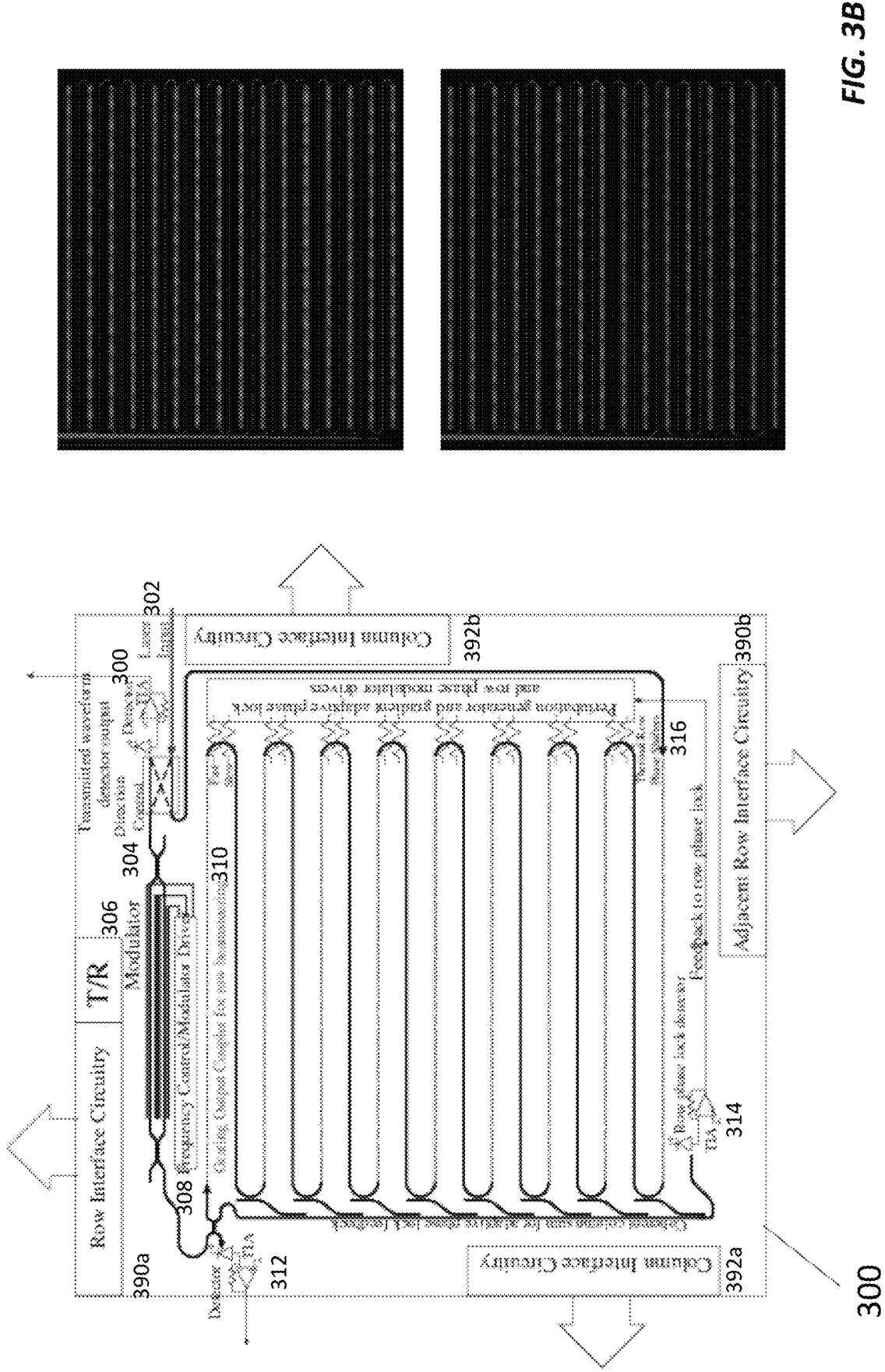

FIG. 3B shows a delay-line grating coupler tile that can be mated with other delay-line grating coupler tiles to form a one- or two-dimensional array of delay-line grating coupler tiles as in FIG. 3A.

Figure 4A:
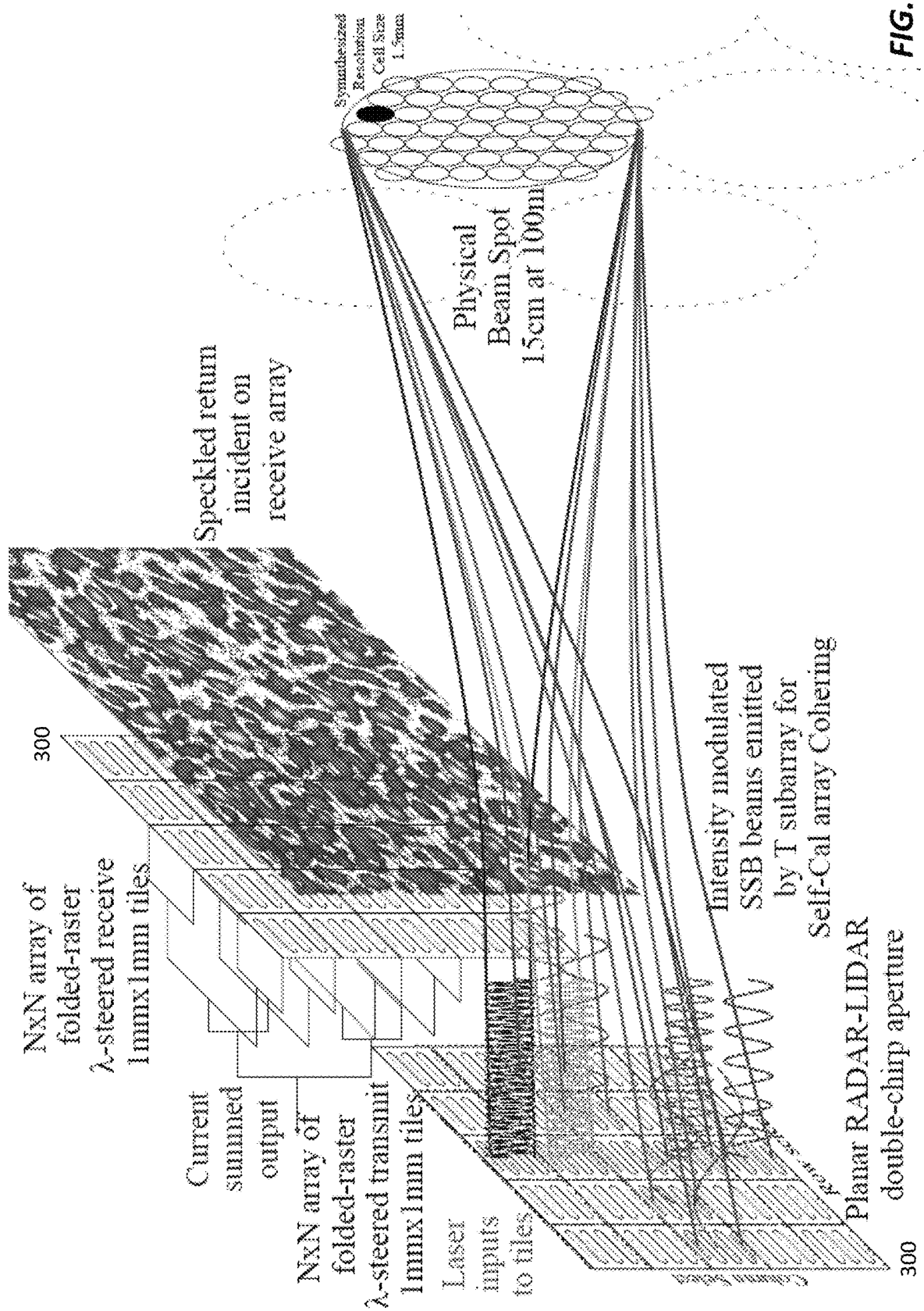

FIG. 4A illustrates radar-lidar sensing with a two-dimensional array of delay-line grating coupler tiles.

Figures 4B, 4C, 4D:
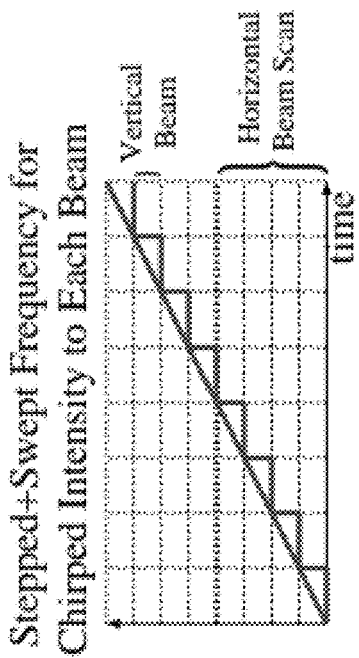

FIG. 4B is a plot of laser frequency versus time for continuous-wave (CW) modulation of signal and reference beams for radar-lidar sensing.

FIG. 4C is a plot of laser frequency versus time for modulation of signal and reference beams with different chirps for radar-lidar sensing.

FIG. 4D is a plot of stepped and swept laser frequency versus time for modulation of signal and reference beams with different chirps for radar-lidar sensing.

Figure 5A:
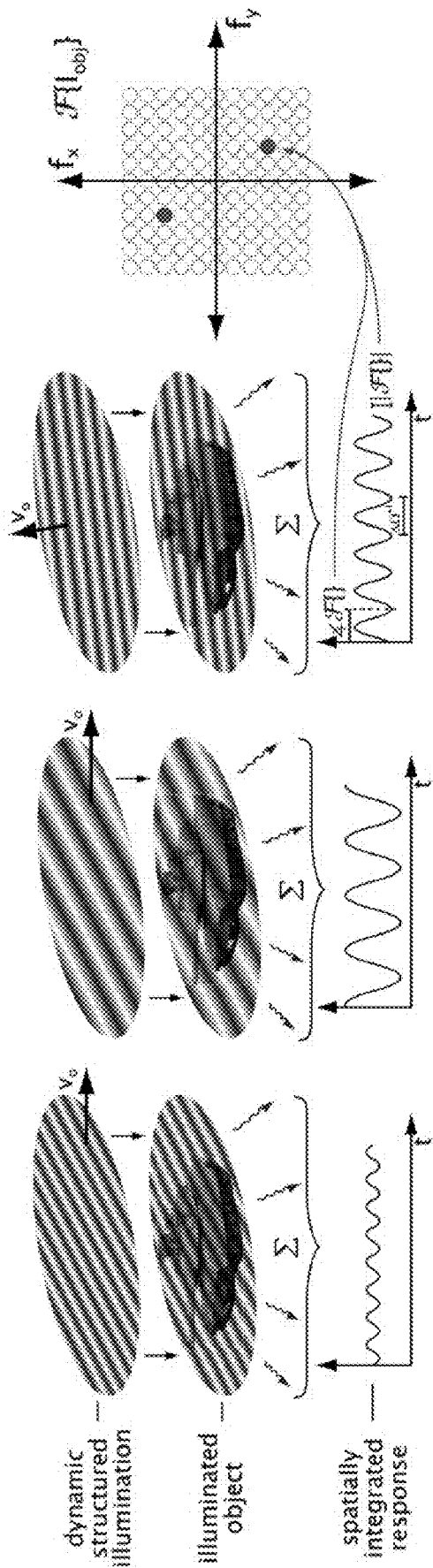

FIG. 5A shows spatial fringe patterns in the object plane (scene) produced using a T-shaped array.

Figure 5B:
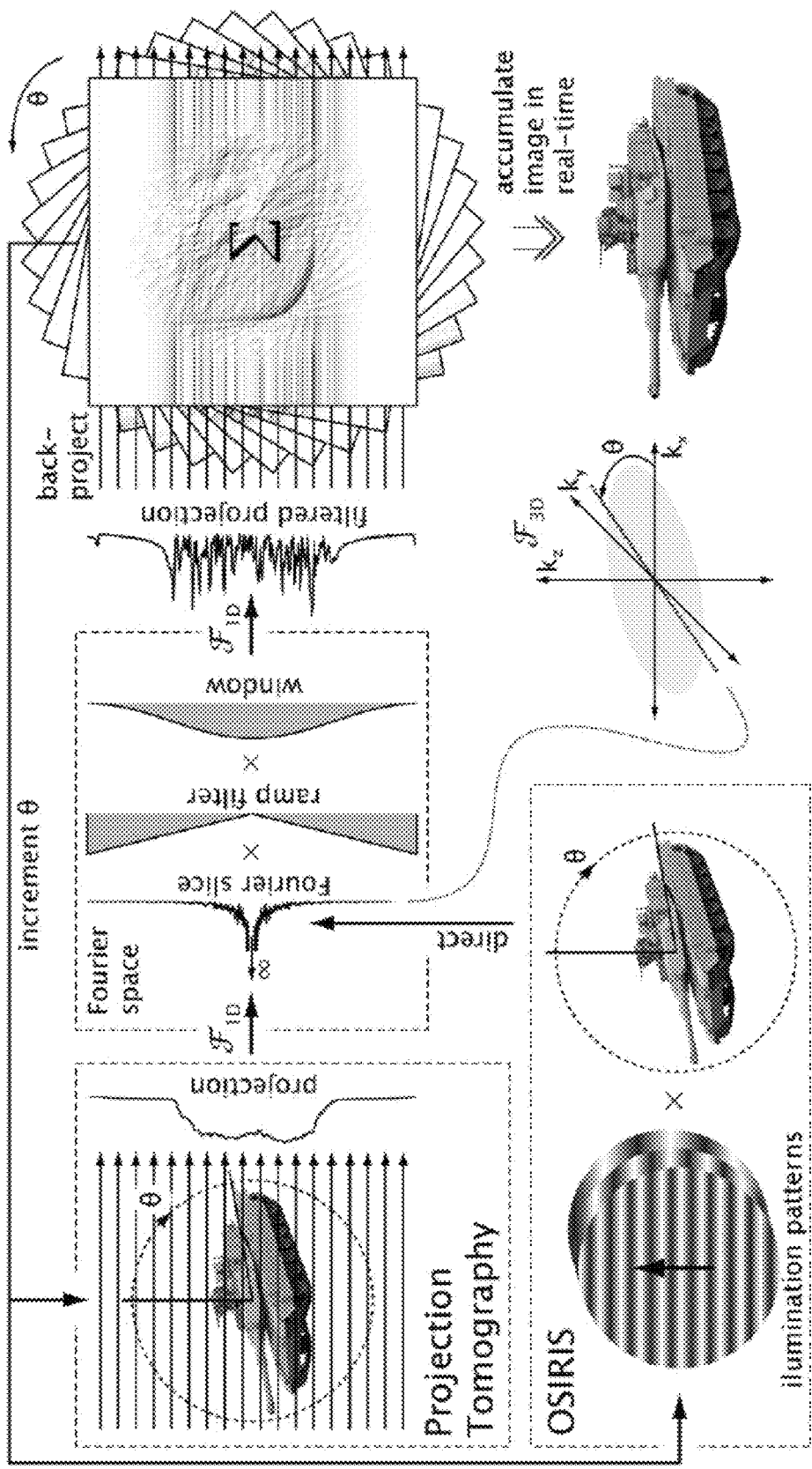

FIG. 5B illustrates Fourier-basis image synthesis using a two-dimensional array of delay-line grating coupler tiles.

Figure 6:
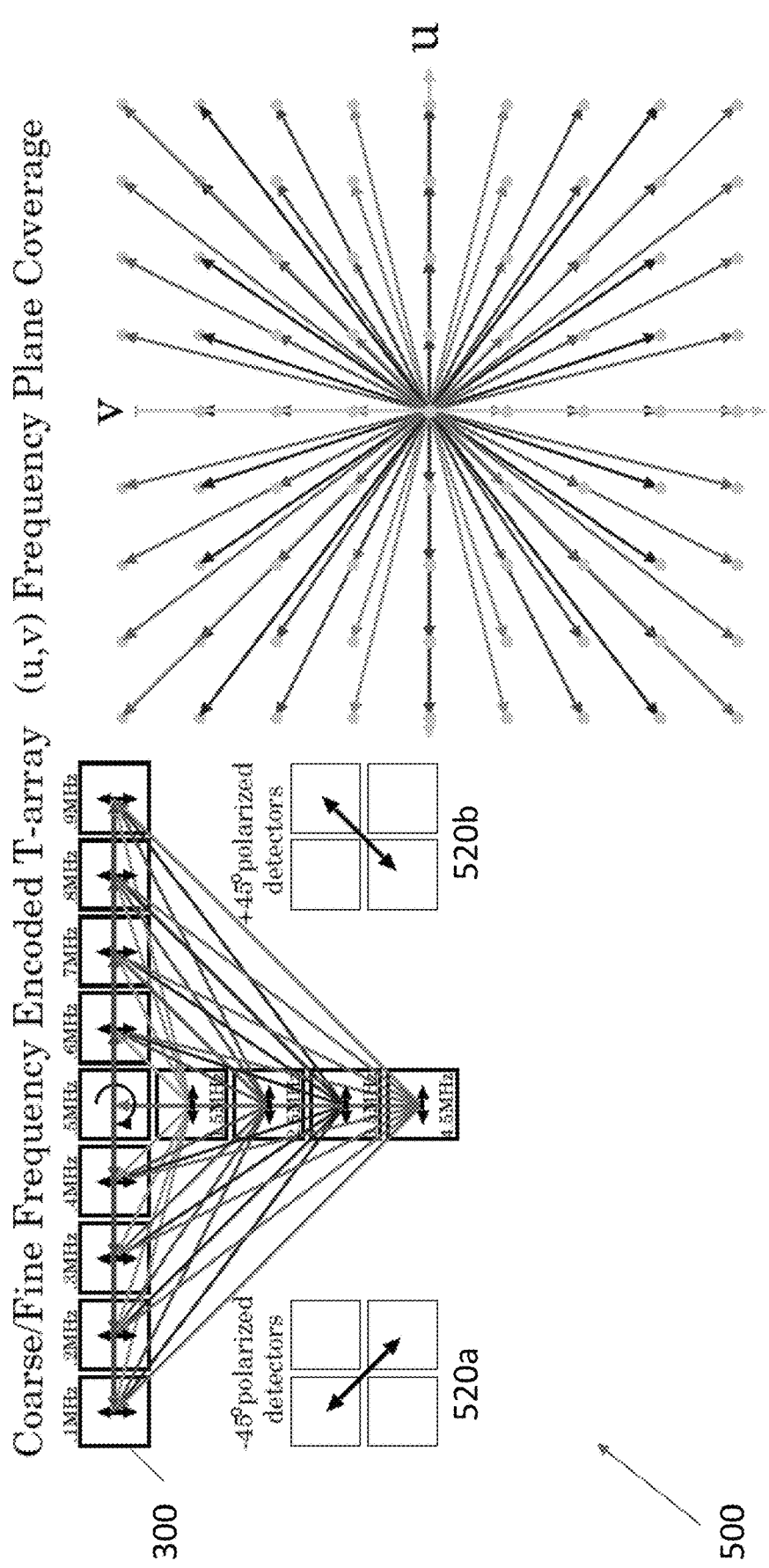

FIG. 6 shows a T-shaped array of delay-line grating coupler tiles for pairwise probing of up to all possible horizontal and vertical spatial frequencies.

Figure 7A:
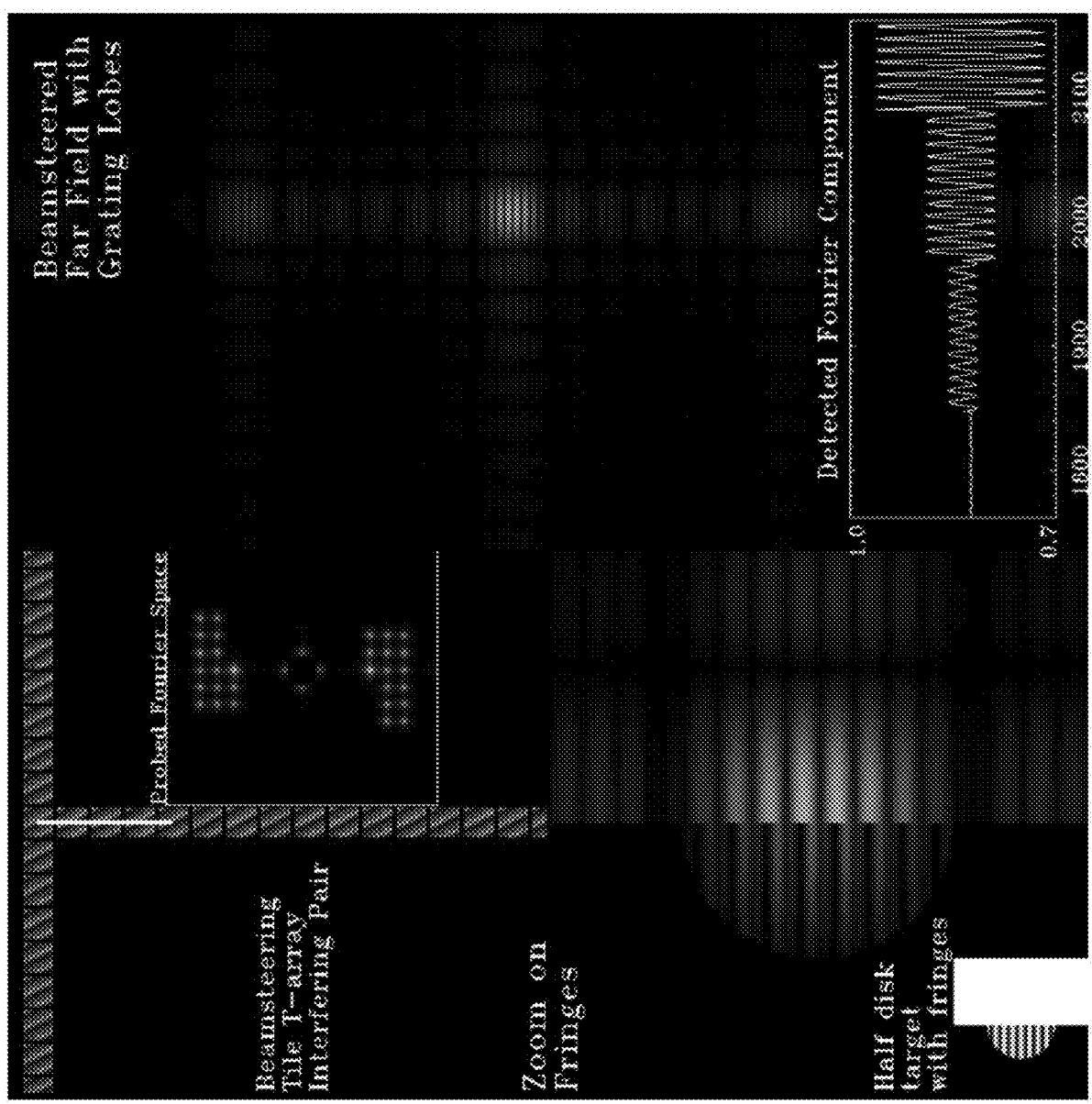

FIG. 7A shows a simulation of SCALABLE operation using a sequence of pairs of transmission tiles from a T-shaped subarray where the tiles are frequency shifted by the row/column address and steered to the far field by the applied optical wavelength.

Figure 7B:
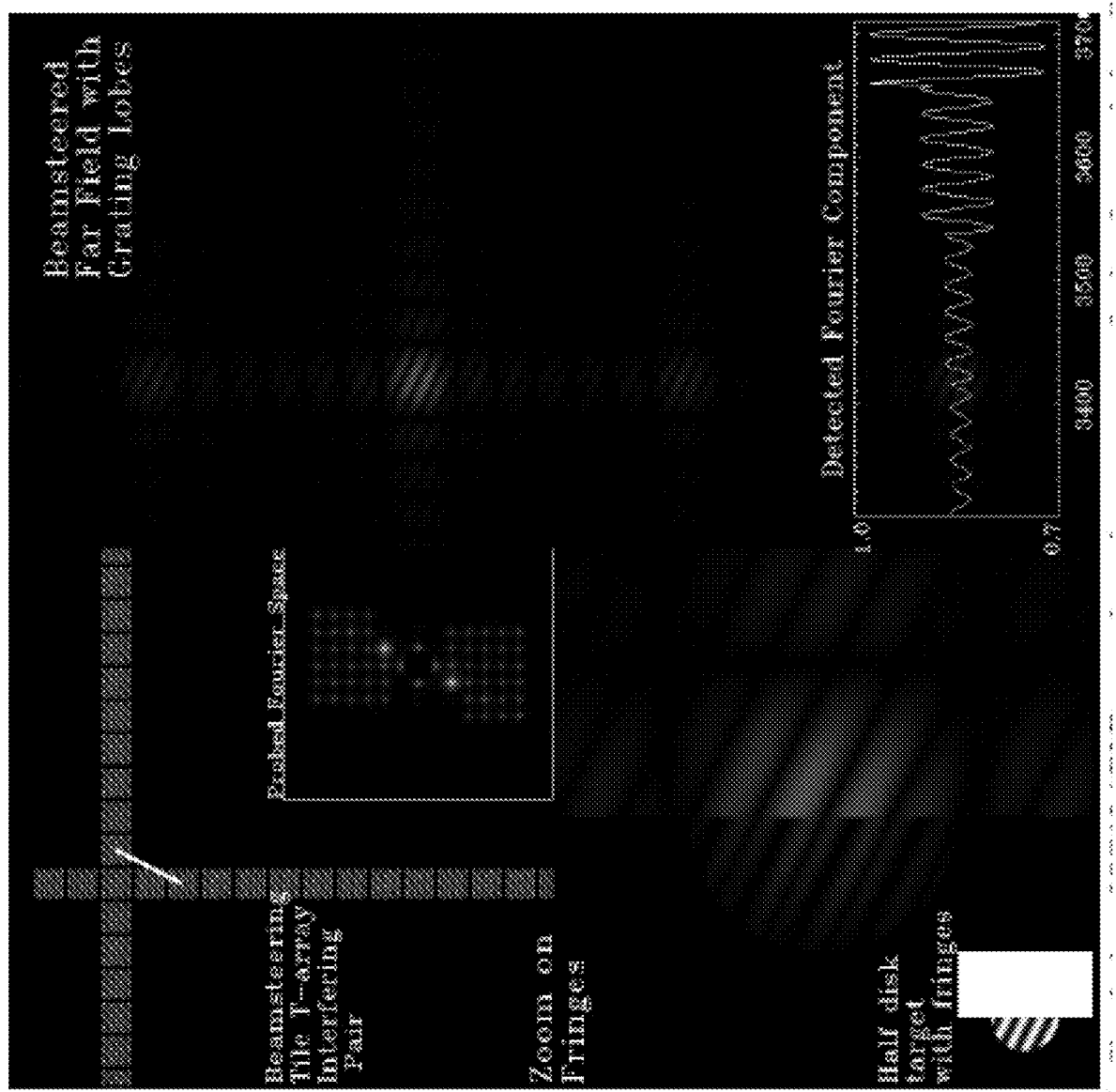

FIG. 7B shows a simulation of SCALABLE operation using a sequence of pairs of transmission tiles from a T-shaped subarray where the tiles are frequency shifted by the row/column address and steered to a different far-field coarse/fine direction by a different applied optical wavelength.

Figure 7C:
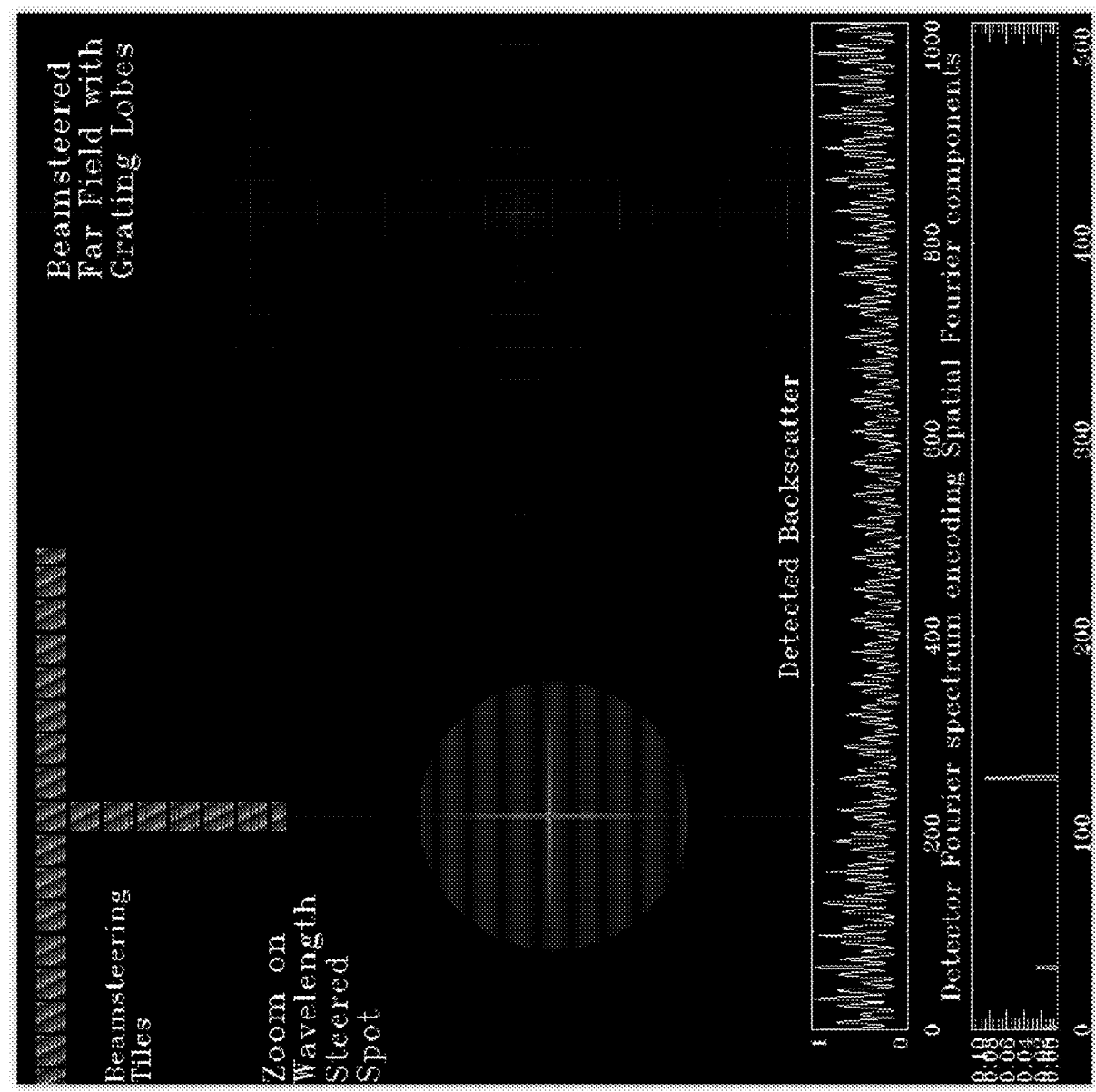

FIG. 7C illustrates a simulation of SCALABLE operation from the entire transmission T-subarray without any phase errors, where the tiles are frequency shifted by the row/column address and steered to the far field by the applied optical wavelength.

Figure 7D:
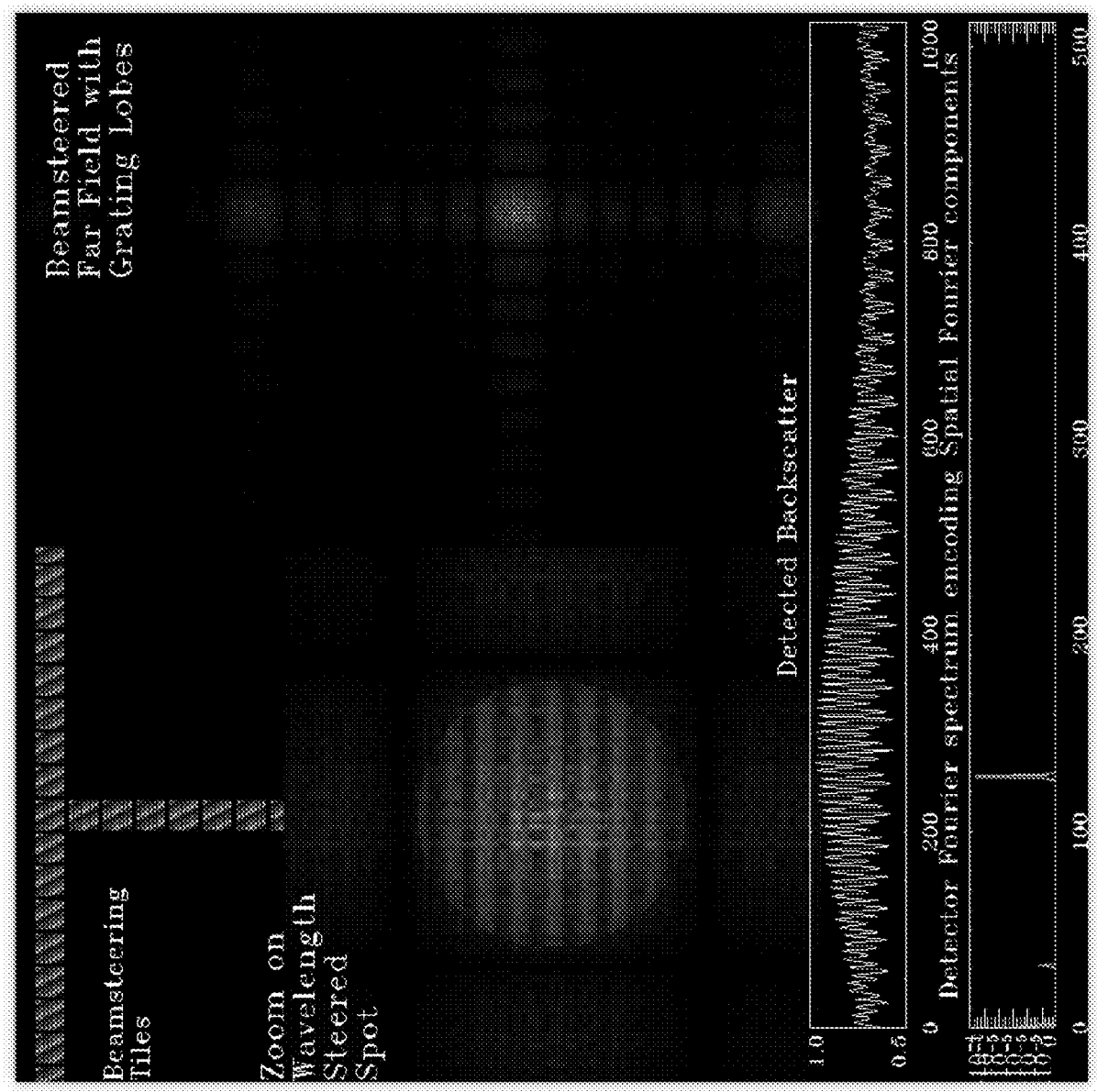

FIG. 7D illustrates a simulation of SCALABLE operation from the entire transmission T-subarray when each tile has acquired a random phase, where the tiles are frequency shifted by the row/column address and steered to the far field by the applied optical wavelength.

Figure 8A:
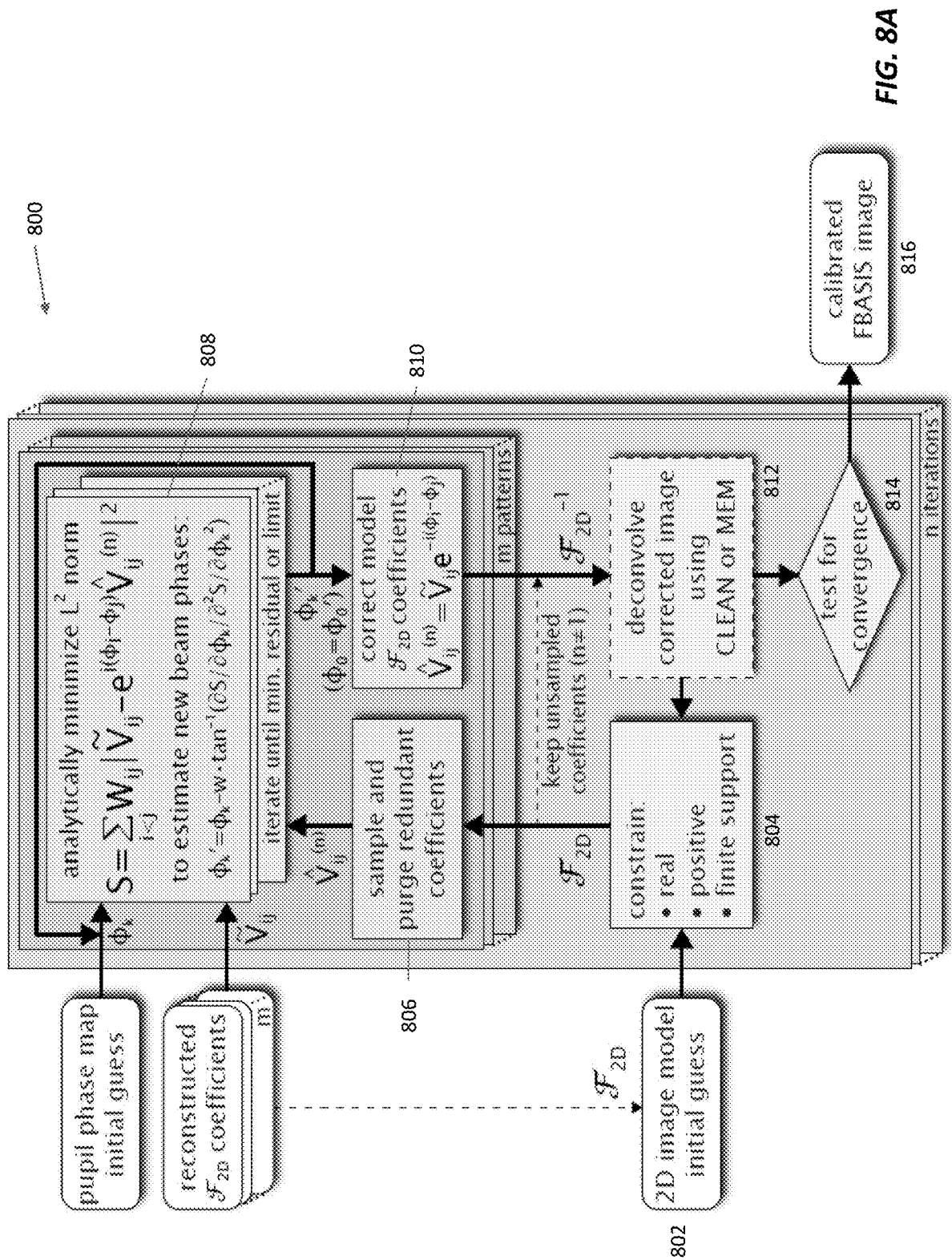
Figure 8B:
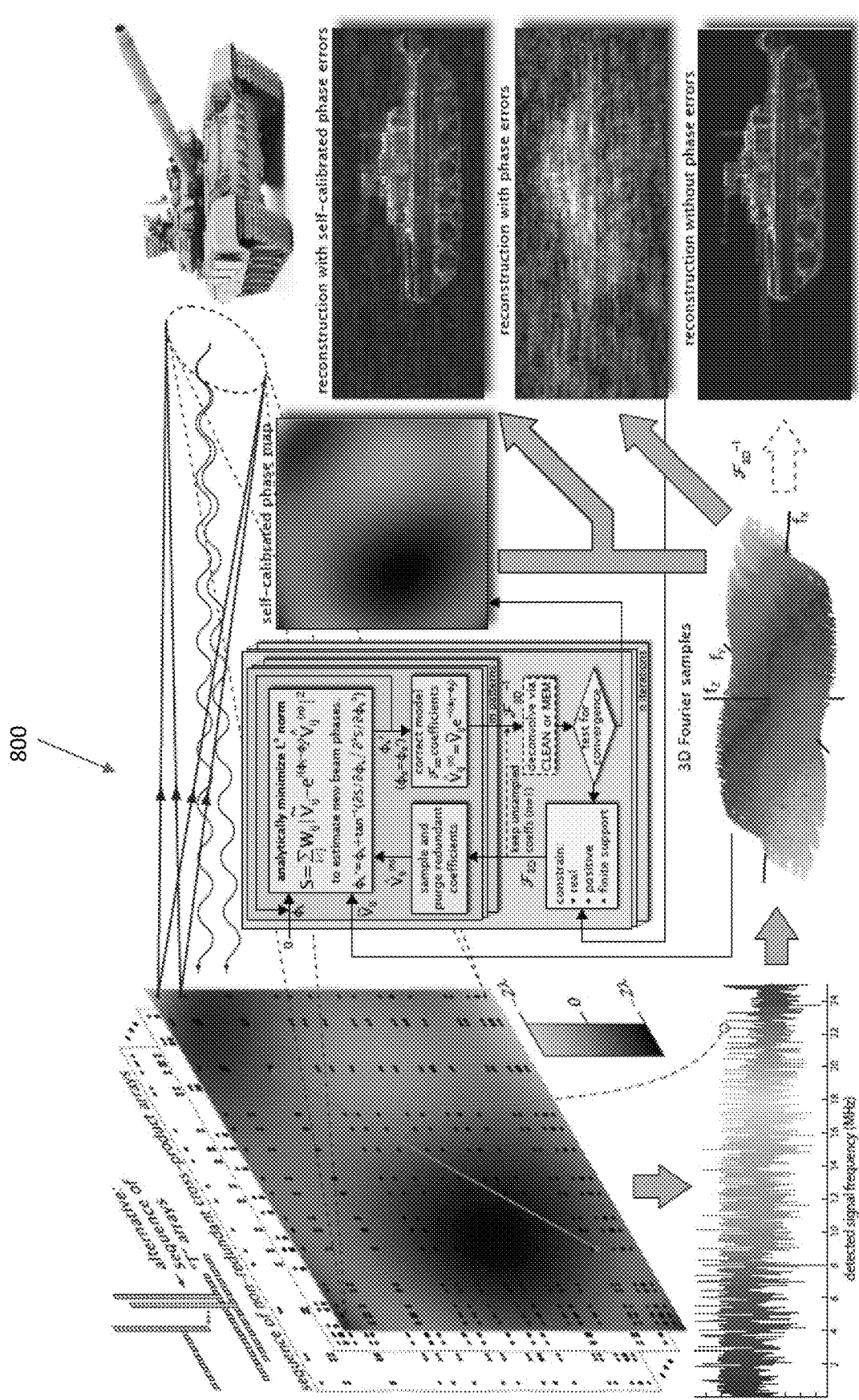

FIGS. 8A and 8B illustrate a Self-Cal process for cohering delay-line grating coupler tiles in an array of delay-line grating coupler tiles.

DETAILED DESCRIPTION

SCALABLE Multibeam Interferometric LIDAR Aperture

A Self-Calibrated Adaptive LIDAR Aperture Building-block Light Engine (SCALABLE) uses a widely tunable laser to perform folded 2D raster beam steering by using a 2D array of silicon-photonic grating couplers connected by an S-shaped, meandering, or serpentine delay line, also called a serpentine delay-line grating coupler or a serpentine optical phased array. This serpentine interconnection between an array of gratings allows coarse laser frequency shifts to scan the beam coupled out of the Si-photonic tile horizontally (along the grating rows) over an angular range (e.g., 40° or more) determined by the laser scanning bandwidth and grating architecture. Fine laser frequency shifts the beam vertically (from row to row) over an unambiguous range (e.g., 12° or more) determined by the grating array spacing.

The folded 2D wavelength steering scheme is fully reversible. This means that when a particular tile is wavelength scanned towards a given angle, then the LIDAR return striking the emitting apertures from that same angle is coupled backwards into the grating rows of the serpentine waveguide and coherently summed with the fields incident on other parts of the tile. The coherently summed fields propagate backwards through the rows of the serpentine grating towards a photodetector.

Using the same tiles for transmit and receive would involve a highly isolating diplexor to separate the few milliwatts of forward propagating transmitted power (and unwanted reflections) in each tile from the few nanowatts of backwards propagating received power. Hence, separate transmitter and receiver tiles may be more practical. In addition, by slightly changing the row spacings of the serpentine gratings in the transmit and receive tiles, a Vernier effect suppresses the returns from the grating lobes.

Coherently summing optical returns across many silicon-photonic receive tiles, each of which is narrower than the speckle correlation length, then summing photocurrents from detectors on each tile across a large array of tiles yields the full gain of the receive aperture with no speckle induced heterodyne loss. This is a unique capability of this wavelength-steered LIDAR tile-array system architecture. This coherent optical summing is not possible in a conventional coherent LIDAR, since the speckle on the return causes phase errors across the receive aperture.

Serpentine Delay-Line Grating Couplers

FIGS. 1A-1D illustrate different serpentine delay-line grating couplers for wavelength beam-steering. FIG. 1A shows a beam-steering tile 100 with a serpentine delay-line grating coupler 102 integrated in a semiconductor substrate 190. The serpentine delay-line grating coupler 102 is a low-loss waveguide that follows a meandering path across the substrate 190, with many bends, turns, and/or curves. It includes grating coupler regions 110, or simply coupler regions, that are formed in straight sections of the waveguide and connected to each other via delay-line regions 120. In this example, the grating coupler regions 110 are arranged in parallel rows that extend in the x direction and are spaced periodically in the y direction. There may also be an output waveguide (not shown) for alignment.

Each grating coupler region 110 includes a section of single-mode input waveguide tapered out to excite the low-loss fundamental mode of a wide, multi-mode waveguide that is weakly coupled to an overlaid silicon nitride periodic grating that is then tapered back down to a single-mode waveguide. These gratings can be formed as ridges 112 on top of the wide, low-loss waveguide or as sidewalls 114 on the sides of the wide, low-loss waveguide. Other designs may use other types of couplers, including photonic crystal couplers or plasmonic couplers.

Except for the first coupler region 110, which is coupled directly to an input from a tunable laser or other coherent light source, the input of each coupler region 110 is coupled to the output of a previous input delay-line region 120. And except for the last coupler region 110, which terminates in the substrate 190, the single-mode waveguide output of each coupler region 110 is coupled to the input of a following input delay-line region 120.

The delay-line regions 120 include straight flyback waveguide sections 124 arranged in rows interleaved with the coupler regions 110 and curved bends and tapered sections 122. Each curved, tapered section 122 has a low-loss, adiabatic bend 122 that folds back to a taper up to a corresponding low-loss flyback waveguide 124 that again tapers back down to a single-mode low-loss, adiabatic bend in the next curved, tapered section 122. This pattern is repeated through a sequence of rows to produce a 2D serpentine-grating array capable of 2D coarse/fine wavelength-controlled beam steering.

When used to emit light, each coupler region 110 performs two functions: (1) it couples light out of the serpentine delay-line grating coupler 102 into a free-space mode and (2) it delays light propagating to the next coupler region 110 in the serpentine delay-line grating coupler 102. Similarly, when used to receive light, each coupler region 110 couples light into the serpentine delay-line grating coupler 102 propagating in the opposite direction. The angle at which each grating couples light into or out of the coupler region 110 depends on the wavelength of the light. Thus, tuning the wavelength causes the beam to scan in the x direction in the beam-steering tile 100 and coordinate frame of FIG. 1A.

Because the coupler regions 110 are fabricated in successive sections of the same meandering optical waveguide, they also impart a time delay onto light propagating through the meandering optical waveguide. Thus, the first coupler region 110 simultaneously emits light out of the waveguide and guides light traveling to the second coupler region 110, with the guided light accumulating a time delay corresponding to the optical path length through the first coupler region 110 and through the delay-line region 120 connecting the first and second coupler regions 110. Conversely, each grating coupler in a conventional, parallel-feed optical phased array generally just couples light into or out of the optical phased array without guiding on to subsequent rows.

FIG. 1B shows a polarization-multiplexed beam-steering tile 101 with double the angular scan range of the beam-steering tile 100 by multiplexing two polarizations (e.g., vertical and horizontal polarizations) into a single input waveguide. The horizontally polarized component scans out of the forward-propagating waveguides and the vertical component scans out of the backward-propagating waveguide. To accomplish this, the polarization-multiplexed beam-steering tile 101 includes a backwards unidirectional grating 111 over the flyback waveguide and polarization rotators 131 in between every row, which are connected by curved and adiabatically tapered delay-line sections 121. This relies on the polarization selectivity of the grating emission in which the horizontal polarization has a good coupling efficiency out of the grating, but the vertical polarization does not since it would lead to a longitudinal radiating field. This tile 101 functions best with nearly perfect polarization rotators 131 (e.g., half waveplates). Imperfections could lead to unwanted crosstalk.

FIG. 1C shows two-dimensional serpentine delay-line grating couplers 103a and 103b that are interleaved without any grating crossings. Interleaving increases the functionality of the serpentine delay-line grating couplers. The delay-line grating couplers 103a and 103b can be fed by a single coherent source via a two-output beam splitter 133. A thermo-optic phase shifter 143 coupled to one output of the beam splitter 133 can be used to set the relative phase between the outputs of the beam splitter 133. In this case, the temporal offset of one serpentine delay-line grating coupler 103a compared to the other 103b is used to hide the unwanted time delay of the flyback waveguide. This allows the fundamental Rayleigh-limited resolution of the slow scan along the row gratings to be exactly equal to the full unambiguous scan of the fast-scan direction from row to row.

FIG. 1D shows an interleaved, bidirectional serpentine grating structure with double the horizontal (x) angular scan range of the interleaved serpentine delay-line grating couplers 110 in FIGS. 1A and 103a and 103b in FIG. 1C. One serpentine delay-line grating coupler 105a couples light out in the forward-propagating grating rows (right arrows) with flybacks to successive rows. It has a scan range from about −30 degrees to 0 degrees and avoids second-order diffractions, which are evanescent over the entire wavelength operating range. The other interleaved serpentine delay-line grating coupler 105b utilizes the same wavelength band but is coupled out on backwards-propagating rows (left arrows) and therefore scans over a range of positive angles from 0 to +30 degrees. This gives a total angular range from −30 to +30 degrees in the slow-scan direction.

The interleaved serpentine delay-line grating couplers 105a and 105b (collectively, the interleaved serpentines 105) can be fed with two separate input beams or a single input beam containing both forward and backwards wavelength bands multiplexed onto two polarization components. The polarization-multiplexed inputs can be coupled into a single waveguide and separated into the control fields for the interleaved serpentines 105 using an on-chip, waveguide polarization beam splitter 135. The k-space operation is illustrated on the right side of FIG. 1D for the two interleaved serpentines 105, showing that both interleaved serpentines 105 can diffract out vertically at the shortest wavelength (vertical arrows) in the band, say 1450 nm. Increasing wavelengths with shorter wavevectors scan out to increasingly negative angle measured with respect to the propagation direction through the grating.

Wavelength-Dependent Beam Steering with a Serpentine Delay-Line Grating Coupler

The coupler region (grating waveguide) in each grating coupler region of the serpentine delay-line grating coupler shown in FIG. 1A includes a waveguide with propagation constant that can be Taylor-expanded to second order with optical frequency deviations from the center frequency:

$$\beta_G(\omega) = \beta_0 + \beta_1(\omega - \omega_o) + \beta_2 \frac{(\omega - \omega_o)^2}{2} = \beta_0 + \beta_1 \Omega + \beta_2 \frac{\Omega^2}{2}$$

Each row of the serpentine delay-line grating coupler array includes a coupler region (grating waveguide) of length L (=1 mm, for example), two corner-turning structures of total phase advance $\phi_C(\omega)$, and a flyback waveguide also of length L, each with frequency-dependent phase advance, giving a total row-to-row phase that can be Taylor-expanded to second order with optical frequency deviations from the center frequency:

$$\phi_r(\omega) = \beta_G(\omega)L + \beta_f(\omega)L + 2\phi_C(\omega) =$$
$$\phi_0 + \phi_1(\omega - \omega_o) + \phi_2 \frac{(\omega - \omega_o)^2}{2} = \phi_0 + \phi_1 \Omega + \phi_2 \frac{\Omega^2}{2}.$$

So, for an incident optical signal from the tunable laser expressed as a Fourier superposition $$s_0(t) = \frac{1}{2\pi} \int S_0(\omega) e^{i\omega t} d\omega$$

the signal incident on the successive rows of the serpentine delay-line grating coupler can be expressed as $$s_m(t) = \frac{1}{2\pi} \int S_0(\omega) e^{i(m\phi_r(\omega)+\Phi_m)} e^{i\omega t} d\omega$$

This incident signal is expressed with multiples of the row-to-row phase accumulation plus an accumulation of the random phases $\Delta\phi_{m'}$ on each row giving a random phase on the mth row as the sum of the random phases of the preceding rows, $$\Phi_m = \Sigma_{m'=1}^m \Delta\phi_{m'}.$$

Each row of the serpentine grating array is displaced vertically by A and propagates the lowest-order mode with possibly frequency dependent profile. The finite grating length, L, and apodization along the grating is represented as:

$$b(x) = \Pi\left(\frac{x}{L} - .5\right) e^{(-\alpha - \eta(\omega) + \gamma)x} b_0(x)$$

which has variation due to waveguide loss $\alpha$, nominal grating strength $\eta(\omega)$, and possible compensating grating strength variation y to make the outcoupling uniform along the row, plus an optional additional apodization $b_0(x)$ to lower the beam-steering side lobes (e.g., a truncated Gaussian profile). Row-to-row mode attenuation, coupling efficiency, and grating strength variation, e(m), can be included to apodize the beam-steering sidelobes along the vertical direction, compensate for row-to-row waveguide loss and outcoupling, or increase the light utilization efficiency (possibly at some expense of the uniformity).

The total field in an M-row serpentine delay-line grating coupler can be represented as $$E(x, y, z, t) = \frac{1}{2\pi}$$
$$\int S_0(\omega) \sum_{m=0}^{M-1} e^{iK_G x} g(z) e(m) e^{i(\omega t - m\phi_r(\omega) - \Phi_m - \beta_G(\omega)x)} b(x) \alpha_\omega(y - m\Delta) \omega(z) d\omega$$

where the grating first harmonic wavevector is $K_G$. The other grating harmonics are evanescent over the operating wavelength range, which may span from 1450-1650 nm. The vertical mode profile, $w_\omega(z)$, and the grating profile, g(z), determine the grating efficiency to the z-propagating beam-steered mode as $$\eta(\omega) = F_z\{w_\omega(z) g(z)\}|_{k_z = \omega/c}.$$

Grating Efficiency

The frequency dependent grating efficiency can more precisely be calculated with the perturbed mode overlap integral between the waveguide mode $\vec{E}^\omega(y,z)$ with propagation constant $\beta_G(\omega)$ and the plane wave with wavevector $\vec{k}=k\cdot\hat{k}$ (with magnitude $k=n\omega/c$:

$$\eta_\omega(\vec{k}) = \iiint e^{i\vec{k}\cdot\vec{r}}(\bar{\bar{I}}-\hat{k}\hat{k})\overline{\Delta\epsilon}(\vec{r})\vec{E}(y,z)e^{-i\beta_G(\omega)x}d\vec{r}$$

FIG. 1A shows the geometry of the grating perturbation for sidewall grating 114 and nitride overlayer gratings 112. is an isotropic perturbation to a silicon waveguide of width w and height h. For a symmetric sidewall perturbation grating (e.g., grating 114 in FIG. 1A), this is given by $$\Delta\epsilon_{sw}(x,y,z) =$$
$$(\epsilon_{Si}-\epsilon_g)\left[\Pi\left(\frac{x}{d}\right)*comb_\Lambda(x)\right]\left[\Pi\left(\frac{y}{p}\right)*\left[\delta\left(y-\frac{w+d}{2}\right)+\delta\left(y+\frac{w+d}{2}\right)\right]\right]\Pi\left(\frac{z}{h}\right)$$

while for an overlayer nitride waveguide grating (e.g., grating 112 in FIG. 1A), the perturbation is $$\Delta\epsilon_N(x,y,z) = (\epsilon_N-\epsilon_g)\left[\Pi\left(\frac{x}{d}\right)*comb_\Lambda(x)\right]\Pi\left(\frac{z-g-(w+p)/2}{p}\right)\Pi\left(\frac{y}{w}\right).$$

where $\epsilon_{Si}$, $\epsilon_g$, $\epsilon_N$ are the dielectric constants of the silicon waveguide, the $SiO_2$ cladding, and the nitride layer, respectively. For a high-frequency grating perturbation, only one Fourier component is not evanescent. This allows the periodicity along x to be replaced by a single grating component $\exp(iK_g x)$, where $K_g=2\pi/\Lambda$. Thus, the grating efficiency at frequency $\omega$ in wavevector direction $\vec{k}$ is:

$$\eta_\omega(\vec{k}) =$$
$$\delta\bar{\epsilon}\int e^{ik_x x}e^{iK_g x}e^{-i\beta_G(\omega)x}dx\int\int e^{i(k_y y+k_z z)}\frac{d}{\Lambda}f(y)g(z)\alpha_\omega(y)w_\omega(z)dydz =$$
$$\delta\bar{\epsilon}\frac{d}{\Lambda}\delta(k_x-K_g+\beta_G(\omega))\mathcal{F}_y\{f(y)\alpha_\omega(y)\}\mathcal{F}_x\{g(z)w_\omega(z)\}$$

Scanned Field

This leads to a field at the surface of the serpentine beam-steering tile propagating into the far field:

$$E(x,y,0,t) =$$
$$\frac{1}{2\pi}\int S_0(\omega)\eta(\omega)b(x)e^{iK_G x}\sum_{m=0}^{M-1}e(m)\alpha_\omega(y-m\Delta)e^{i(\omega t-m\phi_r(\omega)-\Phi_m-\beta_G(\omega)x)}d\omega.$$

For successful vertical scanning, the phase errors from row to row, $\phi_m$, should be negligibly small, e.g., less than $\pi/10$. Assume for simplicity that the accumulated phase $\Phi_m$ is also negligible. If these row-to-row and accumulated phase errors are large, the rows can be phase-cohered by integrated phase shifters on the corners using a row phase error measurement and cohering scheme. In practice, however, the phase is sufficiently precise to provide phase-flat operation over the full serpentine delay-line grating coupler.

Assuming negligible phase errors, the angular spectrum of this field diffracted out of the waveguide allows a compact representation of the far field and is given by the 2D Fourier transform:

$$E(k_x,k_y,t) =$$
$$\mathcal{F}_{xy}\{E(x,y,0,t)\} = \frac{1}{2\pi}\int S_0(\omega)\eta(\omega)e^{i\omega t}\mathcal{F}_x\{b(x)e^{-i(K_g-\beta_G(\omega))x}\}\mathcal{F}_y$$
$$\left\{\sum_{m=0}^{M-1}e(m)\alpha_\omega(y-m\Delta)e^{-i(m\phi_r(\omega)r+\phi_m)}\right\}d\omega =$$
$$\frac{1}{2\pi}\int S_0(\omega)\eta(\omega)e^{i\omega t}B(k_x+K_g-\beta_G(\omega))A_w(k_y)$$
$$e^{-i\frac{M+1}{2}(k_y\Delta+\phi_r(\omega))}\frac{\sin\frac{M}{2}(k_y\Delta+\phi_r(\omega))}{\sin\frac{1}{2}(k_y\Delta+\phi_r(\omega))}d\omega$$

For simplicity, e(m) has been taken to be constant by building in a grating strength modulation to compensate the attenuation and out-coupling exponential decays from row to row. This displays slow-axis beam steering along $k_x$ and fast-axis beam steering along $k_y$ with grating lobes spaced by $2\pi/\Delta$ and tapered by the Fourier transform of the mode profile $A_m(k_y)$. For a single applied frequency tuned to $\omega$, the emission angle along the horizontal slow axis continuously scans without any additional diffraction orders or grating lobes to an angle $$\sin\theta_x = \frac{\beta_0+\beta_1\Omega+\beta_2\frac{\Omega^2}{2}-K_g}{\omega/c}$$

At range z, the emission angle scans to a position on a perpendicular plane in the far field $x_0=z\tan(\theta_x)$ with profile $$E(x,z) = B\left[\frac{\omega}{c}\sin\left(\tan^{-1}\frac{x}{z}\right)+K_g-\beta_G(\omega)\right]$$
$$= e^{i(\frac{\omega}{c}\sin(\tan^{-1}\frac{x}{z})+K_g-\beta_G(\omega))/2}L\text{sinc}$$
$$\left[\frac{L}{2\pi}\left(\frac{\omega}{c}\sin\left(\tan^{-1}\frac{x}{z}\right)+K_g-\beta_G(\omega)\right)\right].$$

The rate of angular scanning with changes of the laser frequency near a frequency $\omega$ slow scanning along the grating rows to an angle $\theta_x$ is given by $$\frac{\partial\theta_x}{\partial\omega} = \frac{\partial n/\partial\omega}{\cos\theta_x}$$

The minimum scan rate occurs at normal and is proportional to $$n' = \frac{\partial n}{\partial\omega}.$$

In the vertical, fast-scan direction, the main lobe of the array function occurs where with a 4 dB width of $2\pi/m\Delta$ and grating lobes spaced by $\Delta k_y = 2\pi/\Delta$. This gives a scan angle $$\sin\theta_y = \frac{k_y^p}{k_0} = \frac{c}{\omega\Delta}\mathrm{mod}2\pi\left(\phi_0 + \phi_1\Omega + \phi_2\frac{\omega^2}{2}\right)$$

which leads to a far field scan position $y_0 = z\tan(\theta_y)$ with a range-varying beam profile $$E(y, z) = M\mathrm{sinc}\left[\frac{M\Delta}{2\pi}\left(\frac{\omega}{c}\sin\left(\tan^{-1}\frac{y}{z}\right) - \frac{\phi_r(\omega)}{\Delta}\right)\right].$$

The rate of angular scan in the fast scan direction can be expressed in terms of the phase offset and slope extrapolated to zero, $\phi_z = \phi_0 - \phi'\omega_0$, as:

$$\frac{\partial\theta_y}{\partial\omega} = \frac{-1}{\cos\theta_y}\frac{1}{k_0\Delta}\frac{\phi_z}{\omega_o}$$

This goes to zero if $\phi_z = 0$ in a dispersion-less delay line corresponding to squint-free True-Time-Delay beam steering. In the dispersive serpentine waveguide used for 2D beam steering with a length of approximately twice the grating length (neglecting the phase accumulated in the tapers and corners), the angular scan rate becomes $-2Ln_0/(\Delta \cos\theta_y)$, which is larger than the angular scan rate along the grating rows by a factor of $2L/\Delta$.

FIG. 1E shows plots of experimentally measured wavelength-tuned beam-steering angle of a serpentine delay-line grating coupler like the one shown in FIG. 1A. Each grating coupler region in the serpentine delay-line grating coupler includes a nitride top bar grating fabricated in a corresponding portion of a silicon waveguide. The serpentine delay-line grating coupler can operate over a wavelength range of about 1300-1700 nm. It produces nearly 20,000 resolvable spots across a 200 nm wavelength range from 1450-1650 nm, with normal emission at a wavelength of 1350 nm and a curved scan due to non-normal emission and near-field planar scan. Along the slow-scan (x) axis, changing the wavelength of the steered beam by 0.33 nm moves the beam by 1 resolvable spot in the far field. And along the fast-scan (y) axis, changing the wavelength of the steered beam by 0.015 nm moves the beam by 1 resolvable spot in the far field giving 25 fast-scan axis unambiguous resolvable spots over each slow-scan resolution bin.

Lidar with Vernier Transmit and Receive Tiles

FIG. 2A shows a bistatic lidar system with a transmit tile 200a and a receive tile 200b. The transmit tile 200a has a serpentine delay-line grating coupler like the one shown in FIG. 1A. Addressing this grating coupler with a wavelength-swept coherent beam (e.g., from a tunable laser) produces a coarse frequency azimuth scan and fine frequency elevation scan in the far field. Continuous-wave laser tones produce a fixed beam-steering direction in which the transmitted laser can be modulated (e.g., in amplitude, phase, or intensity) while a rapidly swept frequency laser scans a 2D array of beams, illustrated in FIG. 2A as covering half the illuminated field-of-view. The scanned laser light scatters off object(s) in the scene, producing returns that are collected and coherently combined by a serpentine delay-line grating coupler in the receive tile 200b.

The transmit tile 200a and receive tile 200b have Vernier-like spacing between their serpentine delay-line grating couplers that suppresses unwanted grating lobes. In this case, the row spacings of the grating couplers in the transmit and receive tiles are different. They accumulate the same delay over the same area but with different numbers of rows. As a result, the central lobes of the receive and transmit tiles array functions overlap while the adjacent lobes are offset due to the Vernier Effect. The receive and transmit tiles array functions and their product are plotted at the upper left of FIG. 2A. The grating lobes of the transmit and receive arrays have different spacings so misalign at the off-axis grating lobes except the main lobe. This misalignment nearly completely avoids lidar returns from the grating lobes without tight physical row spacing.

FIGS. 2B and 2C illustrate different arrangements of "Verniered" transmit and receive tiles. In FIG. 2B, the tiles have identical rows (grating couplers), making them relatively easy to fabricate. The transmit tile has 10 rows, each about 1 mm long, at a row spacing or pitch of 16 μm. The receive tile has 9 rows, also each about 1 mm long, at a row spacing or pitch of 18 μm. In operation, the spatial scanning of transmit and receive tiles drift through each other, with overlap in the desired lowest-order grating lobe.

In FIG. 2C, the transmit and receive tiles have different rows and different row spacings. The transmit tile has 12 rows, each about 1 mm long, at a row spacing or pitch of 16 μm. The receive tile has 11 rows, also each about 1.1 mm long, at a row spacing or pitch of 17.6 μm. Changing the row length keeps the vertical rate of spatial phase accumulation is the same for both tiles but is sampled with a different spacing by the rows. This results in perfect tracking of the main lobe steering with wavelength (or frequency) of the transmit and receive tiles and can even extend the unambiguous scan range of the main lobe while misaligning the unwanted grating lobes of the transmit and receive tiles.

Array of Beam-Steering Tiles with Serpentine Delay-Line Grating Couplers

FIG. 3A shows beam-steering tiles 300 assembled or arranged in a two-dimensional beam-steering array for lidar and other applications. Each tile in the array can perform independently controllable, two-dimensional, wavelength-controlled, coarse/fine beam steering. Each tile can beam steer on its own to different angles (indicated by the beam-steered array functions emerging from some of the tiles in the array) or can be driven simultaneously by light at multiple wavelengths to produce multiple beam-steered beams simultaneously.

Ganging tiles together allows an even larger array aperture with higher power and more coherent gain. Optical amplifiers in the distribution manifold that feeds the tiles can make up for any splitting loss in the distribution manifold and enable high-power operation. If the tiles radiate out of phase, they be phase-cohered with phase shifters or cohered in receive signal processing. In a transmit tile, the input laser from the amplified distribution network is modulated by a local CW tone and applied to the serpentine delay-line grating coupler. In a receive tile, the backward-coupled received LIDAR signal is coupled into a photodetector which drives the current-summing network across the array of tiles.

In one mode of operation, all or some subset of the tiles (e.g., a T-shaped sub-array or non-redundantly spaced 2D subarray) can be driven by the same wavelength laser. A modulator in or coupled to each tile modulates that tile's beam with a unique encoding. This design utilized a dual-layer silicon nitride grating, where a phase shift between the two layers of the grating allows a near unidirectional emission to be enhanced and avoids a 3 dB loss of beam-steered light coupled downwards into the silicon chip substrate. The phase shift also reduces wavelength-dependent destructive interference between the directly emitted beam and the substrate beam, which may reflect out of the chip.

FIG. 3B shows a schematic optical and electronic functional floor plan of a single tile 300 in the array of FIG. 3A. The tile 300 may be about 1 mm by 1 mm and includes an integrated serpentine delay-line grating coupler 310 for optical frequency-domain coarse/fine 2D beam steering. The plots at right in FIG. 3B show simulated emission from the tile 300 before (top) and after (bottom) row cohering. An auxiliary waveguide couples a small amount of light from each row in order to measure possible row-to-row phase errors for adaptive phase-error compensation.

The tile 300 includes an input/output 302 that can be coupled to tunable laser or another wavelength-tunable coherent light source. A direction controller (e.g., an integrated optical switch) 304 controlled by transmit/receive (T/R) logic 306 switches the tile 300 between transmit and receive modes. A phase modulator 306 couples the direction controller 304 to the serpentine delay-line grating coupler 310 via an integrated beam splitter and is controlled by a frequency control/modulator driver 308. A detector 312 coupled to the other output of the integrated beam splitter monitors optical power going into or coming out of the serpentine delay-line grating coupler 310. Taps weakly couple a tiny fraction of light out of each row of the serpentine delay-line grating coupler 310 to a row phase-lock detector 314, which detects the coherent summation of the tapped light. Multiple uncorrelated or orthogonal frequency outputs from the perturbation generator 313 drives single-sideband (SSB) phase modulators (e.g., thermo-optic phase shifters) 316 operably coupled to respective rows in the serpentine delay-line grating coupler 310. The correlation between the row phase lock detector 314 and the row perturbation signals is calculated by the feedback electronics 313 to determine the DC drive of each row phase modulator in order to cohere the rows when the tile 300 is driven by a CW cohering laser. The tile 300 also includes row and column interface and initialization circuitry 390$a$, 390$b$, 392$a$, and 392$b$.

Double-Chirping Radar-LIDAR in an Array of Wavelength-Steered Tiles

FIGS. 4A-4C illustrate a unique radar-LIDAR scheme for the (arrays of) beam-steering tiles described above. This scheme can be employed in a single tile (monostatic lidar), a pair of tiles (bistatic lidar), or arrays of transmit and receive tiles as shown in FIG. 4A. In this scheme, a chirped laser reference tracks along with a chirped laser signal to simultaneously scan both beams to overlap and interfere in the far field sequentially at all angles. This produces either a radio-frequency (RF) intensity-modulated beat tone when the two chirp rates are equal but are time or frequency offset, as in FIG. 4B; an RF chirped intensity modulation riding on a carrier frequency-swept across an ultrabroad optical spectrum, as in FIG. 4C; or an RF modulation that changes in intensity in a stepped, chirped fashion, as in FIG. 4D. In each case, the instantaneous frequencies of the reference and signal bandwidths are within the tile's resolution bandwidth so that they scan together in angle.

The central frequency of the pair of chirps rapidly beam-steers the laser beam in 2D using a folded-raster 2D beam-steering scheme employing a much more compact serpentine grating delay line than previous approaches. As an example, a signal laser that sweeps over 20 THz from 190 THz to 210 THz (150 nm centered at 1500 nm) in a time of 10 ms could scan a 2D folded raster addressing system through about 320 slow-scan resolvable angles in x and 32 fast-scan resolvable angles in y, with a dwell time on each resolvable angle of 1 µs. Simultaneously and synchronously sweeping the reference beam synchronously from 190.004 THz to 210.004 THz (on an offset frequency of 4 GHz, which is less than the fast-scan resolution bandwidth) produces two scanned, overlapping beams with a 4 GHz frequency offset at each angle in raster sequence. These beams interfere to produce an RF-modulated intensity in each direction.

Sweeping this 20 THz bandwidth in 1 µs (1000 faster as produced by an optical coherence tomography (OCT) laser) spit out 1 ns long, 4 GHz modulated pulses in each direction in a raster sequence appropriate for lidar ranging without an on-chip modulator. Sweeping the two beams at slightly different chirp rates (e.g., that separate from −4 GHz to +4 GHz) across the entire 10 ms long sweep yields a resolvably different RF beat note in each direction. In this case, the frequency of the RF intensity modulation is proportional to the optical carrier, allowing interesting wavelength and frequency channelized detection strategies. This scan rate is a fraction of the speed possible with highly linearized, swept-frequency laser sources developed for optical coherence tomography (OCT), such as the Insight Akinetik laser, which can scan 150 nm in 2 µs.

Because the signal and reference beams are so close in frequency, they overlap in angle and illuminate the same resolvable spot in the far field. As a result, they generate returns with the same or nearly the same speckle pattern as shown in FIG. 4A. These speckle patterns interfere at the array of receive tiles to produce a speckle pattern that blinks at the heterodyne beat frequency between the signal and reference beams. Atmospheric turbulence, changes in surface roughness, and other environmental perturbation affect the signal and reference speckle patterns about equally, so they should not affect the visibility of the temporal fringes at the heterodyne beat frequency produced by the interference of the signal and reference speckle patterns. This yields heterodyne gain without the deleterious effects of speckle that plague other coherent lidars.

Fourier-BASIS Image Synthesis and Self-Cal for Cohering the Array

Transmitting the LIDAR signal and reference from two different tiles in a tiled array with slightly offset frequencies illuminates a spot in the far field with a spatial interference fringe pattern that moves due to the frequency offset. This fringe pattern probes the corresponding spatial Fourier component of the illuminated patch, whose amplitude and phase are encoded into the amplitude and phase of the temporally blinking LIDAR return detected by the array of receive tiles.

In FIG. 4A, for example, a transmit array of wavelength-beam-steered tiles illuminates a far-field spot from multiple tiles. Moving spatial fringes illuminate the objects on the ground to sample the objects' spatial Fourier components. The receive array detects and current sums the return signal coupled back into the waveguide of each receive tile.

Different pairs of transmit tiles with varying orientations and separations yield measurements of different spatial Fourier components of the object within the illuminated area as shown FIGS. 5A and 5B. Transmission from a non-redundant array of N tiles (such as a T-shaped array as in FIG. 6 or the 18×18 non-redundant tile array in FIG. 8B, both described below) produces N=n(n−1)/2 simultaneous spatial fringe patterns, which can each be coded onto unique temporal difference frequencies. Measuring all (or most)

Fourier components of the illuminated target allows an image to be reconstructed by Fourier synthesis.

Phase errors in the beams launched by the different tiles can be compensated by cohering the tiles' phases. This phase cohering can be accomplished by determining the inter-tile phase errors without anything in front of the planar aperture by just processing the LIDAR returns. This approach is based on the elegant principle of phase-closure and the Self-Cal process used with non-redundant receive arrays in optical and radio astronomy and is modified here to use spatio-temporal non-redundant transmit array topologies. A sequence of non-redundant sub-arrays (such as Golay arrays or crossed one-dimensional non-redundant arrays as shown in FIG. 8B) can be selected from the two-dimensional array of tiles for cohering through a sequence of measurements covering all the tiles.

FIG. 4A shows a T-shaped sub-array topology suitable for phase cohering with Self-Cal. The jth row of elements is used as a frequency multiplexed transmit aperture with small incremental frequency spacing (say $\delta f=0.1$ MHz spanning $k\delta f=10$ MHz), while the k'th column of elements is used with a large incremental frequency spacing (say $\Delta f=10$ MHz spanning $j'\Delta f=1$ GHz). Within the wavelength-steered beam, the pairwise interference between the row and column elements produces moving intensity-modulated interference fringes that probe and measure the resolvable sub-image spatial Fourier components, $\cos(2\pi\{((k-k')\delta f+(j-j')\Delta f)t+(d/\lambda z)[x(j-j')+y(k-k')]\})$ oscillating at distinct temporal frequencies, $(k-k')\delta f-(j-j)\Delta f$. Spatial heterodyning with the matched sub-image spatial Fourier components produces a back-scattered return amplitude detected by the LIDAR receive array encoding the corresponding spatial Fourier component of the object. The phase is given by the object's Fourier component phase plus a tile phase calibration error $\phi_{jk}-\phi_{j'k''}$.

An alternative encoding using time-shifted pseudo-noise (PN) bi-phase modulated transmit waveforms on the rows and columns. The interference between two shifts of such BPSK codes acts like a product over its Galois field and produces another shift. The shifts between different shifted PN codes yield unique shifts. This results in a PN-modulated spatial fringe pattern that allows spatial fringe phase measurement by correlating the received waveform against the PN code and separately detecting in-phase and quadrature components. This PN encoding has the advantage of simpler BPSK optical modulators and on-chip PN-code generation electronics using linear feedback shift registers. This approach allows simultaneous high-resolution lidar ranging by circulantly correlating the return against the PN code.

For a T-shaped sub-array, there are $N(N-1)(N-2)=6$ independent triplet closure phase conditions, which Self-Cal optimizes to determine the unknown element phase errors. The Schwab algorithm provides an efficient, analytic, weighted least-square, iterative minimization of these phase errors, that along with positive and finite support constraints can be used to calculate the unknown phases, which can be subtracted from the measurement phases to Fourier synthesize the sub-image illuminated by that wavelength-steered beam. Repeating across N T-shaped subarrays using different rows and columns of the 2D array can fully calibrate the 2D array. This array-cohering process provides diffraction-limited sub-beam imaging and can be repeated any time the tile phases drift due to temperature or other perturbations. The calculated element phases can be applied to the tiles in the array to cohere the emitted beams or used in the post-detection computation of the diffraction limited images within each beam addressed by the wavelength-steering mechanism.

Simulated Imaging Using a T-Shaped Array of Transmit Tiles

One advantage of the tile arrays described herein is the ability to transmit from multiple individual LIDAR wavelength-beam steering tiles simultaneously so that the scanned fields overlap and interfere on the target. This interference produces a spatial fringe pattern that can probe Fourier components of the illuminated object. If all the tiles could be made to be identical in-phase beams with no phase offset from tile to tile, then all the tiles of the array could be combined to form an interference spot at the center of the scanned beam from each tile with a much smaller spot size, higher peak intensity, and much finer image resolution than the spot produced by an individual (millimeter-scale) tile. For example, a millimeter-scale tile at a range of 1 km would illuminate an area 1.5 meters across, but an array of 100×100 millimeter-scale tiles could focus to a spot only 1.5 cm at the same 1 km range.

Introducing spatial linear phase factors across the array of transmit tiles can scan this small, coherently focused spot within the aperture of the wavelength-steered beam. However, the adaptive process that servos the phases of the tiles to be equal presents many challenges in practice. These challenges can be addressed by simultaneously transmitting a unique code from each tile in a non-redundant subset of tiles rather than from all the tiles. This unique code should have the property that the interferometric beat between each pair of transmitting tiles is unique.

FIG. 4A shows an implementation of this scheme where the non-redundant array of transmit tiles is a T-shaped array 500 (or "+"-shaped array) with one row and one column, and the laser frequency is offset by fine increments for the rows and coarse frequencies for the columns. The transmit tiles 300 are all scanned to the same angle by driving them with coherent light at the same wavelength, but locally frequency offset to nearby frequencies. These offset frequencies might be from 100 kHz to 10 MHz along the rows and 10 MHz to 1 GHz along the columns of a 100×100 array of tiles. These are small frequency shifts compared to the coarse/fine 2D wavelength scanning of the serpentine grating in each tile, which might use a 5-10 GHz frequency shift to move by one resolvable spot in the fine scan direction and a 100-200 GHz (e.g., about 0.5-1.0 nm of wavelength) to move by one resolvable spot along the coarse scan axis. In reception, the entire receive array is used to accumulate the incident speckle and integrate across the speckled LIDAR return. This integration is an incoherent accumulation of the blinking speckle field and could be accomplished with a large photomultiplier or using the tiled array in reception with a detector for the backwards propagating received signal in each tile and a global current sum across the array of tiles using a time delay matched H-tree.

Each transmitting tile from the T-shaped array arrives in the far field at the target as a slightly tilted beam where the beams overlap and interfere. Pairs of tilted beams can be considered to interfere on the target producing a planar (e.g., linear) set of interference fringes which move at a constant velocity due to the difference of frequency offsets between the two transmitting tiles. Note that interference doesn't actually happen until the backscatter is detected by the photodetector, but the explanation will be much clearer and more succinct by considering interference to take place on the target. The interference fringes have a spatial periodicity proportional to the separation vector between the two interfering tiles.

FIG. 6 illustrates a T-shaped array transmit aperture 500 that achieves uniform coverage of the spatial frequency domain. The aperture 500 includes vertically and horizontally arrayed tiles 300 that receive coherent light at a single wavelength and that locally frequency shift the coherent light by unique amounts that are less than the tiles' resolution bandwidth. The spatial frequency sampled by a pair of tiles is determined by their difference vectors, which are represented by arrows and illustrated in the (u, v) plane diagram on the right, showing an ideal uniform coverage with no gaps or redundant samples.

The uniform spatial frequency coverage in FIG. 6 is accomplished with some polarization trickery. Vertically polarizing the row of fine frequency (0.1 MHz) offset transmitters and horizontally polarizing the column of coarse frequency (1 MHz) offset transmitters produces polarization-modulated fringes on the target rather than intensity fringes. Detectors 520*a* and 520*b* with polarizers oriented at ±45° produce complimentary signals that can be subtracted to produce the ideal Fourier sampling signals.

The spatial frequencies of the moving fringes produced on the targets can be enumerated by considering the set of difference vectors of the transmitting tiles in the T-shaped transmitting array embedded in a 10×10 array of transmitting and receiving tiles as illustrated in FIG. 6. The horizontally polarized transmitters in the top row of the T have offset frequencies of 0.1 MHz through 0.9 MHz at 0.1 MHz increments and the vertically polarized transmitters in the column of the T have offset frequencies at 0.5 MHz, 1.5 MHz, 2.5 MHz, 3.5 MHz, and 4.5 MHz. At the intersection of the row and column, both polarizations are contained in a circular polarized beam.

Light from the bottom tile interferes with light from all the tiles in the top row with the longest difference vectors in FIG. 6. The other pairs have shorter difference vectors. Translating these difference vectors to the same origin and considering both signs yields the spatial frequency representation known as the (u, v)-plane, which shows a full and uniform frequency coverage, characteristic of the T-shaped array. The T-shaped array actually has a (u, v) coverage given by the T-shaped array's autocorrelation, which has a spike at the origin, horizontal and vertical triangles, and the uniform plateau. By using the polarization encoding indicated here it is possible to eliminate the horizontal and vertical ridges by only detecting the cross-polarized interference terms. This can be done by using ±45° polarizers to selectively detect the beat notes at +45° and −45° and subtracting these two detector signals. This yields the (u, v)-plane coverage shown in FIG. 6.

Without this polarization encoding of the T-shaped array, the spatial frequency components along the horizontal and vertical axes of the (u, v)-plane may be redundantly sampled. This can cause imaging artifacts if not accounted for in post-detection signal processing by rejecting beat frequencies associated with the horizontal and vertical grating vectors. This is due to the fact that the separation between the adjacent tiles along the horizontal axis is identical for all adjacent pairs, and so is their frequency difference. This is also true for adjacent tiles along the vertical axis.

The consequence of this redundancy motivates elimination of the redundancy either using the polarization scheme in FIG. 6 or in post-detection signal processing. For a transmit array in which the jkth element (row j and column k) has offset frequency (j+Nk)Δf, the field emitted by that tile is given by $$e_{jk}(x, y, z = 0, t) =$$

$$b_{jk}e^{j\phi_{jk}}a(x - j\Delta_x, y - k\Delta_y)e^{-i\left[\frac{2\pi}{\lambda}(\alpha x+\beta y)\right]}e^{i[(\omega_o+(j+Nk)\Delta\omega)(t-k_oz)]}$$

where $b_{jk}$ is the amplitude (nominally constant) and $\phi_{jk}$ is the phase. a(x, y) is the emitted profile from the tapered serpentine array and can be engineered to be nearly a uniform output. (Row sampling produces grating lobes, which are neglected here for simplicity and since their effect is eliminated by the transmit/receive Vernier.) The wavelength through the serpentine beam-steering array determines the direction cosines of the emitted field α, β along x, y, and z, and $k_0=2\pi/\lambda$. Thus, the far field at a distance z incident on the target from that tile is given by the scaled Fourier transform along x and y, with the quadratic phase in the Fraunhoffer regime, giving $$E_{jk}(x', y', z', t) = b_{jk}e^{j\phi_{jk}}A\left(\frac{1}{\lambda z}(x' - \alpha z), \frac{1}{\lambda z}(y' - \beta z)\right)$$

$$e^{-i\frac{2\pi}{\lambda z}(x'j\Delta_x+y'k\Delta_y)}e^{i(\omega_o+(j+Nk)\Delta\omega)(t-k_oz)}e^{i\frac{\pi}{\lambda z}(x'^2 + y'^2)},$$

where A(u, v) is the Fourier transform of the emitted profile, a(x, y). The pairwise interference between the row and column elements produces moving intensity modulated interference fringes within the far-field profile A, each oscillating at a distinct temporal frequency. Between tiles/k and j'k' and for simplicity assuming a rectangular uniform emitted profile of width $W_x$ and height $W_y$, the far field intensity is $$I(x', y', z, c) = W_x^2 W_y^2 \mathrm{sinc}^2\left[\frac{x'W_x}{\lambda z}, \frac{y'W_y}{\lambda z}\right]\overbrace{(|b_{jk}|^2 + |b_{j'k'}|^2)}^{s(x',y')}\left[1 + m\cos\left[2\pi\left([(j-j') + N(k-k')]\Delta f(t-z/c) - \frac{(j-j')\Delta_x x' + (k-k')\Delta_y y'}{\lambda z}\right) + \overbrace{\phi_{jk} - \phi_{j'k'}}^{\delta}\right]\right]$$

where the modulation depth is less than 1 and can be expressed as $$m = \frac{2b_{jk}b_{j'k'}}{|b_{jk}|^2 + |b_{j'k'}|^2}.$$

s(x', y') is the range-scaled, beam-steered intensity profile. Note the Fraunhoffer quadratic phase term has canceled, and the small spatial shifts between the beams are considered negligible in the far field since $(j-j')\Delta_x \ll \lambda z/W_x$ and similarly along y.

Consider an illuminated object in the area of the scanned beam with a back-scattering intensity reflectivity profile that is purely real and positive given by $$r(x',y')=\iint R(u,v)e^{i2\pi(ux'+vy')}dudv$$

where the Fourier expansion, R(u, v), is two-sided and Hermitian symmetric. For convenience it is useful to consider the Fourier expansion of the illuminated target $$T(u,v) = \iint r(x',y') s(x',y') e^{-2\pi i(ux'+vy')} dx' dy' = R(u,v) ** S(u,v)$$

With a uniform emission profile, a(x, y), the angular-spectrum blur function is of the form of a scaled 2D triangle function. Backscatter is given by the integrated product between the incident intensity I(x', y', t) and r(x', y') that is collected out of $2\pi$ steradians by the collection aperture with M tiles at a range of $z_0$.

$$d(t) = \frac{\overline{MW_x W_y}}{2\pi z_0^2} \cdot \iint I(x', y', t) r(x', y') dx' dy' =$$

$$\eta \iint s(x', y') \left[1 + \frac{m}{2} e^{i(\Omega t - \vec{K}_g \cdot \vec{x}' + \delta) + cc}\right] r(x', y') dx' dy' =$$

$$\eta \iint \left[1 + \frac{m}{2} e^{i(\Omega(t - \gamma z_0/c) - \vec{K}_g \cdot \vec{x} + \delta)}\right]$$

$$+ cc \Big] \frac{1}{(2\pi)^2} \iint T(k_x, k_y) e^{i(k_x x' + k_y y')} dk_x dk_y dx' dy' =$$

$$\eta \frac{1}{(2\pi)^2} \iint T(k_x, k_y) \left[\iint e^{i(k_x x' + k_y y')} \Big[1 + \frac{m}{2} e^{i[\Omega(t - \gamma z_0/c) - (K_x^g x' + K_y^g y') + \delta]} + cc\Big] dx' dy'\right] dk_x dk_y =$$

$$\eta \iint T(k_x, k_y) \left[\delta(k_x, k_y) + \frac{m}{2} \delta(k_x - K_x^g, k_y + K_y^g) e^{i(\Omega(t - z_0/c) + \delta)} + \frac{m}{2} \delta(k_x + K_x^g, k_y + K_y^g) e^{-i(\Omega(t - z_0/c) + \delta)}\right] dk_x dk_y =$$

$$\eta\left(T(0,0) + \frac{m}{2} T(K_x^g, K_y^g) e^{i(\Omega(t-\gamma z_0/c)+\delta)} + \frac{m}{2} T(-K_x^g, K_y^g) e^{-i(\Omega(t-\gamma z_0/c)+\delta)}\right) =$$

$$\eta(T(0,0) + m \mid T(K_x^g, K_y^g) \mid \cos(\Omega(t - \gamma z_0/c) + \angle T(K_x^g, K_y^g) + \delta))$$

In this expression the fringe angular frequency $\Omega$ depends only on the difference of transmit tile x coordinates j–j' and difference of y coordinates k–k' times the frequency scale factor of the increments along the vertical dimension $N\Delta f$, compared to the horizontal dimension, $\Delta f$, which is at least the number of horizontal pixels N times larger to have unique temporal frequencies for each probed spatial frequency. This allows the tiles to probe the spatial Fourier components of a reflective target within a scanned beam by assembling enough complex Fourier components to Fourier synthesize the reflectivity profile. The probed spatial Fourier components at a range $z_o$ have x and y components $$K_x^g = 2\pi p \frac{\Delta_x}{\lambda z_o} \text{ and } K_y^g = 2\pi q \frac{\Delta_y}{\lambda z_o}.$$

The spatial Fourier components are measured as the amplitude and phase of the temporal oscillation, and the mapping between the temporal frequency and the spatial frequency is a coarse/fine combination of the x and y components of the grating vector. The residual phase error can be removed through a process of self-calibration using constraints on beam triples. The range dependent phase $$\delta' = \Omega z_o/c = 2\pi \Delta f[(j - j') + N(k - k')]\frac{z_o}{c} = \frac{\Delta f}{v}\left[\frac{K_x^g}{\Delta_x} + \frac{K_y^g}{\Delta_y}\right]z_o^2$$

results in a spatial linear phase that shifts the sub-image reconstruction and may be compensated when sub-images are stitched together, especially if over the wide field different sub-images are at different ranges in comparison to the resolvable range spanned by the frequency encoding $\Delta z = c/2NM\Delta f$. Similarly, amplitude errors can be removed through a four-beam self-calibration process.

FIGS. 7A and 7B show two different T-sub arrays of a simulated 32×32 tile SCALABLE system where each T-shaped array is driven by a slightly shifted optical frequency and beam-steered in a correspondingly different direction along both the coarse and fine axes of the serpentine grating towards two different targets. In each figure, the near field T-shaped array of serpentine beam-steering elements is shown on the upper left and the far field beam-steering pattern is shown on the right for two elements connected by the vector on the T-shaped array. These two elements interfere to produce the indicated spatial interference fringe (with lines of constant intensity perpendicular to the separation vector which gives the wave vector of the spatial fringes that moves at a velocity determined by the difference in frequencies. FIGS. 7A and 7B each show a different snapshot of this moving interference pattern as a magnified image on the lower left that is multiplied by the local target reflectivity (a circular half disk containing a sinusoidal reflectivity modulation and a uniform half rectangle), for the special case when the interference fringe is matched in frequency and orientation to the target.

Spatial heterodyning with the matched sub-image spatial Fourier components produces a back-scattered return amplitude detected by the LIDAR receive array encoding the corresponding spatial Fourier component of the object. The phase is given by the object's Fourier component phase plus a tile phase calibration error. This is illustrated by the recent time-domain detected waveform shown on the lower right of FIGS. 7A and 8B. This waveform illustrates the detected sinusoidal oscillation as the fringes traverse across the object, and then step to a new amplitude and phase as a new pair of transmitting tiles is turned on. When the spatial frequency matches that encoded within the disk (selected when two tiles vertically separated along the T are energized in FIG. 7A), the matched Fourier component produces its largest temporal swing because the bright and dark bars of the illumination pass over the reflective and opaque regions of the target. This produces a transition from very bright to very dark reflective signals. FIGS. 7A and 7B demonstrate sequential probing of the spatial frequencies by stepping through the row and column tiles of the transmitting T-shaped array and placing the measured Fourier component in the accumulating array shown in the figure insets.

FIGS. 7C and 7D illustrate simulations of an operational mode with simultaneous transmission from all the tiles. Initially, all the tiles transmit the appropriate frequency-shifted versions of the transmitted laser with no additional phase (or amplitude) errors between the tiles. In these simulations, the target is a circular disk containing a sinusoidal modulation of its reflectivity as shown in the zoomed inset under the T (horizontal fringe pattern) and the illuminating field is the focused spot and cross.

FIG. 7C shows all the tiles in phase, with a sharp focus (from the uniform coverage of the (u, v)-plane) and horizontal and vertical cross (from the redundancies along the x and y axes of the autocorrelation of the T aperture). The sharp spot arises from the in-phase superposition of the pairwise sinusoidal interference patterns with the same amplitudes. Because each tile is at a different frequency lexicographically ordered in two dimensions, the point that is in phase linearly translates in time. This focused spot moves in a raster fashion, rapidly and repeatedly in the vertical axis and slowly across the horizontal axis within the sinc-shaped aperture of the scanned beam. It produces a backscattered intensity reflection (return) that is detected as the temporal waveform shown along the bottom of FIG. 7C. The Fourier spectra are shown below the temporal waveform, with in this case one dominant temporal frequency peak corresponding to the vertical spatial frequency of the target.

FIG. 7D illustrates a simulation where the individual tiles transmit with a random relative phase. This random phase may be very likely although some correlation may exist over a short distance. Random phase tends to be more problematic than small amplitude variations, but self-calibration can compensate both phase and amplitude errors. In this case, the target is painted with an essential random speckle field apodized by the $sinc^2$ aperture of the wavelength beam-steered spot. Amazingly, this entire speckle pattern itself moves in a raster pattern, just like the ideal in-phase spot moves in FIG. 7C. As the speckle pattern moves, it produces an intensity reflection that oscillates in time, producing the detected signal shown along the bottom of FIG. 7D. Since the phase relationships are not the same, this time-domain signal looks similar, but not identical, to the time-domain signal in FIG. 7C. Somewhat surprisingly, the temporal Fourier transform amplitude component looks identical to the one in FIG. 7C, although the phases of the measured Fourier components in this case are not correct. Self-Cal can correct the phases of these measured Fourier components and produce diffraction-limited imagery even when the phases of the transmitted tiles are random.

Self-Cal for SCALABLE

SCALABLE beam-steering tiles can be cohered using a self-calibration process (Self-Cal) based on the Schwab algorithm, which was originally developed for calibrating received radio astronomy telescope signals from a similar non-redundant array without assuming any a priori knowledge about the target being imaged. The non-redundant T-shaped array of interfering RF-encoded beams in an array of SCALABLE beam-steering tiles is analogous to a non-redundant radio telescope array known as a Mills cross. However, unlike a radio telescope array with several dozen telescopes forming several hundred independent baselines, for example, an N×N array of SCALABLE beam-steering tiles with an embedded T-shaped array produces on the order of $N^2=10,000$ interferometric beam pairs for N=100 in a 10 cm by 10 cm array of beam-steering tiles. Each beam pair measures a different spatial Fourier component, allowing image reconstruction within each wavelength scanned LIDAR beam.

The computationally efficient Self-Cal process can be used to adjust the unknown phases corrupting each transmitting tile aperture. The dense Fourier sampling attainable with a T-shaped array results in much lower point-spread function (PSF) sidelobes and corresponding Fourier-domain under-sampling artifacts compared to radio telescope data. Thus, whereas astronomers use an iterative method, such as CLEAN or MEM, to reduce PSF sidelobes for each Self-Cal iteration, iteration is unnecessary in self-calibrating SCALABLE data, greatly speeding up computation.

One of the attractive features of the Schwab algorithm is that it models the corrupted image as resulting from a relatively small number of beam phase errors (for example, 2N−1=199 beams in the T-shaped array), rather than assuming an independent phase error for each measured Fourier component (on the order of $N^2$). This allows the use of analytic least mean square (LMS) minimization to solve for the beam phase errors, instead of using computationally-expensive gradient descent algorithms. Iterating this analytical minimization to convergence can hurt the convergence of Self-Cal while just one step was insufficient; two steps of analytical minimization in the inner loop give good performance. As a result of these computational savings, instead of the thousands of iterations typically used for iterative phase retrieval, Self-Cal in SCALABLE typically converges in just a few dozen iterations, with each iteration using much less computation.

FIGS. 8A and 8B illustrate an F-BASIS Self-Cal method 800. Self-Cal begins with an initial guess for the model image (box 802). Typically, the corrupted reconstruction itself can be used as the initial model. The reconstructed image is constrained to be real and positive (box 804; setting values below a threshold to 0) since the array is measuring a power reflectivity image, not a complex image. This reconstructed image is Fourier transformed and sampled using the SCALABLE optical transfer function (OTF), which is given by the autocorrelation of the N×N T-shaped array, with the DC value set to 0. The redundantly sampled horizontal and vertical spatial frequencies are treated separately, either deemphasized by their redundancy or eliminated completely (box 806).

In box 808, an error function S dependent on the M=2N−1 beam phases is computed for each beam by summing, across all beam pairs, the magnitude-squared differences between the measured complex Fourier coefficients $\tilde{V}_{ij}'=|\tilde{V}_{ij}|e^{i\Phi v}$ and the model complex Fourier coefficients $\hat{V}_{ij}'|\hat{V}_{ij}|e^{i\Phi v}$ phase-shifted by the difference between the element phase errors $\phi_i$ and $\phi_j$ at the corresponding pair of beams:

$$S(\phi_1, \dots \phi_j, \dots \phi_M) = \sum_{i<j} W_{ij}|\tilde{V}_{ij} - e^{i(\phi_i - \phi_j)}\hat{V}_{ij}^{(n)}|^2$$

Optionally, weights $W_{ij}$ can be applied for each beam pair contributing to the error function to account for nonuniformities of the quality and signal-to-noise ratio (SNR) of the measurements of the ij Fourier component, although these weights can be set to unity. Since for each beam phase $\phi_k$ (which can be initially set to 0) this error function is a sum of phased sinusoids (one for each term in the sum), it is itself cosinusoidal along that dimension ($S \sim B - a\cos(\phi_k - u_k)$) with minimum at $u_k$, a new beam phase error $\phi'_k$ that minimizes S can be estimated by computing the arctangent of the first and second derivatives of the error function $$\frac{\partial S}{\partial \phi_k} = a\sin(\phi_k - u_k)$$

$$\frac{\partial^2 S}{\partial \phi_k^2} = a\cos(\phi_k - u_k)$$

Then the minimum of S with respect to each of the $\phi_k$, $u_k$, is found in one step. But changing the other $\phi_{k'}^q$, k'≠k; changes the minimum $u_k$ along that dimension so the system is iterated a few times, q=1, ..., until convergence using a relaxation parameter, such as η~0.8 as suggested by Schwab:

$$\phi_k^{q+1} = \phi_k^q - \eta \tan^{-1}\left[\frac{\frac{\partial S}{\partial \phi_k}}{\frac{\partial^2 S}{\partial \phi_k^2}}\right] =$$

$$\phi_k^q - \eta \tan^{-1}\left[\frac{a\sin(\phi_k^q - u_k)}{a\cos(\phi_k^q - u_k)}\right] = \phi_k^q - \eta(\phi_k^q - u_k) \Rightarrow \phi_k^\infty \to u_k$$

This analytic minimization step (box 808) for all k of the M=2N−1 beams in the T-shaped array is internally iterated several times until a minimum phase error residual is reached or a maximum number of iterations is exceeded (the illustrated results are for two iterations and did not continue iterating until convergence). A new model is then computed by pairwise application of the newly estimated beam phase errors Ok to the measured Fourier coefficients (box 810). Having computed a new model, the process 800 iterates until the beam phase error estimates converge, which is determined by deconvolving the corrected image (box 812) and testing it for convergence (box 814). The final beam phase error estimates are used to compensate the phases of the interferometrically measured beam-pair Fourier components to produce the final image (box 816).

CONCLUSION

The silicon-photonic serpentine grating LIDAR beam-steering tiles disclosed here can be made using conventional photonic integrated circuit fabrication possesses. They offer unique coarse/fine wavelength-tuned 2D beam steering and can be arrayed into large LIDAR emitting arrays hybrid-coupled to III-V optical amplifier and distribution wafers. The tile arrays can include interleaved receive and transmit tiles. They may perform bistatic Radar-LIDAR interferometric probing of object spatial Fourier components using frequency-shifted and PN-coded transmit beams; Self-Cal for phase cohering the transmit tiles; and ranging and imaging of targets from long range with range resolution as fine as 5 cm while calibrating out the effects of turbulence and device phase errors.

The serpentine delay-line waveguide disclosed here can be implemented as a serpentine waveguide patterned in a photonic device layer on a semiconductor chip. In this case, the forward propagation and backward return-path propagation waveguide sections can be connected by waveguide bends (e.g., 180-degree, or U, bends) or by waveguide tapers and waveguide bends (e.g., taper-bend-taper). In other embodiments, the serpentine delay-line waveguide may comprise waveguide structures in multiple layers. For example, forward propagation could occur in a first device layer, and return path propagation could occur on a second device layer, for example, below the first device layer, with the forward and return paths coupled by an inter-layer coupling structure in addition to bends and tapers. Such implementations fully eliminate the negative impact of the return path waveguides on the aperture fill factor.

Implementations may be in silicon photonics chips and can in other integrated photonic platforms. Other suitable platforms include silicon nitride or silicon oxynitride device layer platforms, and III-V semiconductor waveguide platforms, silicon carbide, as well as chalcogenide glasses as waveguiding layers. Suitable platforms include waveguide systems with capability to impart strong confinement on the guided wave—with an index contrast of at least 20% between core and cladding, and preferably above 35%. In certain embodiments, the index contrast is over 200% (silicon core, silica cladding).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A beam-steering system comprising:
a substrate;
a serpentine optical waveguide, disposed on the substrate, to guide optical radiation; and
an array of coupler regions, formed in or on the serpentine optical waveguide, to emit the optical radiation out of the serpentine optical waveguide toward a scene at an angle that varies in a first axis and a second axis with a wavelength of the optical radiation, the array of coupler regions comprising a first coupler region to couple a first portion of the optical radiation out of the serpentine optical waveguide and to delay a second portion of the optical radiation guided to a second coupler region in the array of coupler regions via the serpentine optical waveguide.

2. The beam-steering system of claim 1, further comprising:
a coherent light source, optically coupled to the serpentine optical waveguide, to emit the optical radiation and to tune the wavelength of the optical radiation over a bandwidth of about 200 nm in under about 10 ms.

3. The beam-steering system of claim 2, wherein:
the coherent light source is configured to emit reference optical radiation shifted in frequency with respect to the optical radiation by less than a resolution bandwidth of the array of coupler regions, and
the coupler regions in the array of grating coupler regions are configured to emit the reference optical radiation toward the scene at an angle that varies in the first axis and the second axis with a wavelength of the reference optical radiation.

4. The beam-steering system of claim 1, wherein the coupler regions in the array of coupler regions are parallel to each other along the first axis and define respective gratings with grating vectors parallel to the second axis.

5. The beam-steering system of claim 1, wherein the serpentine optical waveguide is a transmit serpentine optical waveguide and the array of coupler regions is an array of transmit coupler regions, and further comprising:
a receive serpentine optical waveguide; and
an array of receive coupler regions, formed in or on the receive serpentine optical waveguide, to couple at least one return from the scene into the receive serpentine optical waveguide.

6. The beam-steering system of claim 5, wherein the array of transmit coupler regions are spaced at a first pitch and the array of receive coupler regions are spaced at a second pitch different than the first pitch.

7. The beam-steering system of claim 6, wherein the array of transmit coupler regions have a first grating periodicity and the array of receive coupler regions have a second grating periodicity different than the first grating periodicity.

8. The beam-steering system of claim 5, wherein the transmit serpentine optical waveguide and array of transmit coupler regions form a transmit beam-steering tile in a two-dimensional array of transmit beam-steering tiles.

9. The beam-steering system of claim 8, wherein the receive serpentine optical waveguide and array of receive coupler regions form a receive beam-steering tile in a two-dimensional array of receive beam-steering tiles.

10. The beam-steering system of claim 8, wherein the transmit beam-steering tile comprises:
a phase modulator, operably coupled to the transmit serpentine optical waveguide, to modulate at least one of a phase or a frequency of the optical radiation.

11. A lidar comprising:
at least one coherent light source to emit a probe beam and a reference beam;
a transmit optical phased array, optically coupled to the at least one coherent light source and having transmitting grating lobes spaced at a first period, to direct the probe beam onto a scene at an angle that varies with a wavelength of the probe beam and to direct the reference beam onto the scene at an angle that varies with a wavelength of the reference beam, the reference beam interfering with the probe beam to produce an intensity beat; and
a receive optical phased array, having receiving grating lobes spaced by a second period different than the first period, to receive returns from the scene, the receiving grating lobes suppressing returns at angles corresponding to at least one transmitting grating lobe, wherein the reference beam is shifted in frequency with respect to the probe beam by a frequency shift less than a resolution bandwidth of the transmit optical phased array.

12. The lidar of claim 11, further comprising:
a photodetector, in optical communication with the receive optical phased array, to detect a heterodyne signal at a frequency of the intensity beat on the scene, the frequency of the heterodyne signal depending on a distance to the scene.

13. The lidar of claim 11, further wherein the transmit optical phased array comprises a serpentine optical waveguide to guide the probe beam, the serpentine optical waveguide having (i) parallel waveguide sections arrayed at a first pitch and connected by respective delay-line waveguide sections and (ii) gratings formed in the parallel waveguide sections to emit respective portions of the probe beam toward the scene.

14. A lidar comprising:
at least one coherent light source to emit a first probe beam;
a first transmit optical phased array in a two-dimensional array of transmit optical phased arrays, optically coupled to the at least one coherent light source and having transmitting grating lobes spaced at a first period, to direct the first probe beam onto a scene at an angle that varies with a wavelength of the first probe beam, wherein the first transmit optical phased array comprises a serpentine optical waveguide to guide the first probe beam, the serpentine optical waveguide having (i) parallel waveguide sections arrayed at a first pitch and connected by respective delay-line waveguide sections and (ii) gratings formed in the parallel waveguide sections to emit respective portions of the first probe beam toward the scene;
a second transmit optical phased array in the two-dimensional array of transmit optical phased arrays to direct a second probe beam onto the scene at an angle that varies with a wavelength of the second probe beam;
a phase modulator, operably coupled to the first transmit optical phased array, to temporally modulate a relative phase between the first probe beam and the second probe beam; and
a receive optical phased array, having receiving grating lobes spaced by a second period different than the first period, to receive returns from the scene, the receiving grating lobes suppressing returns at angles corresponding to at least one transmitting grating lobe.

15. The lidar of claim 14, wherein the first probe beam interferes with the second probe beam to produce a spatial fringe pattern with a spatial phase depending on the relative phase.

16. The lidar of claim 14, wherein the phase modulator is configured to modulate the first probe beam with a pseudo-noise (PN) waveform so as to illuminate the scene with a temporally PN-modulated spatial fringe pattern.

17. A method of remote sensing, the method comprising:
generating a first illumination beam and a second illumination beam coherent with the first illumination beam;
directing, from respective grating regions in a first serpentine delay-line grating coupler in a first transmit array in a two-dimensional array of transmit arrays, the first illumination beam onto a scene;
directing, from respective grating regions in a second serpentine delay-line grating coupler in a second transmit array in the two-dimensional array of transmit arrays, the second illumination beam onto the scene to produce a fringe pattern;
shifting a phase of the fringe pattern by controlling a relative phase between the first illumination beam and the second illumination beam; and
receiving, with a receive array, a return from the scene, the return having an amplitude and a phase corresponding to a spatial Fourier component of the scene substantially matching an amplitude and a phase of the fringe pattern.

18. The method of claim 17, wherein the spatial Fourier component represents part of an image of the scene.

19. The method of claim 17, further comprising:
directing, with a third transmit array in the two-dimensional array of transmit arrays, a third illumination beam onto the scene to produce another fringe pattern; and
receiving, with the receive array, another return from the scene, the other return representing a spatial Fourier component of the scene probed by the other fringe pattern.

* * * * *